United States Patent
Sunaga et al.

(10) Patent No.: US 11,198,744 B2
(45) Date of Patent: Dec. 14, 2021

(54) 1,3,7-OCTATRIENE POLYMER, HYDRIDE THEREOF, AND METHOD FOR PRODUCING SAID POLYMER

(71) Applicant: KURARAY CO., LTD., Kurashiki (JP)

(72) Inventors: Shuichi Sunaga, Kurashiki (JP); Tomoaki Tsuji, Chiyoda-ku (JP); Takashi Hori, Kurashiki (JP); Yasutaka Inubushi, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 134 days.

(21) Appl. No.: 16/468,217

(22) PCT Filed: Dec. 28, 2017

(86) PCT No.: PCT/JP2017/047392
§ 371 (c)(1),
(2) Date: Jun. 10, 2019

(87) PCT Pub. No.: WO2018/124304
PCT Pub. Date: Jul. 5, 2018

(65) Prior Publication Data
US 2019/0330393 A1    Oct. 31, 2019

(30) Foreign Application Priority Data
Dec. 28, 2016 (JP) .............................. JP2016-257105

(51) Int. Cl.
*C08F 36/22* (2006.01)
(52) U.S. Cl.
CPC .................................. *C08F 36/22* (2013.01)
(58) Field of Classification Search
CPC ...... C08F 36/32; C08F 236/32; C08F 236/08; C08F 236/22
See application file for complete search history.

(56) References Cited

U.S. PATENT DOCUMENTS

| | | | |
|---|---|---|---|
| 3,285,889 A | | 11/1966 | Arnold |
| 3,939,131 A | * | 2/1976 | Morikawa .............. C08F 236/20 526/281 |
| 4,229,549 A | * | 10/1980 | Usami ................... C08F 265/04 525/308 |
| 5,863,958 A | | 1/1999 | Dyer et al. |
| 2019/0315899 A1 | * | 10/2019 | Sunaga ..................... C08F 2/38 |
| 2019/0359754 A1 | * | 11/2019 | Sunaga ..................... C08F 8/04 |
| 2020/0095359 A1 | * | 3/2020 | Sunaga ................. C08F 297/04 |

FOREIGN PATENT DOCUMENTS

| | | |
|---|---|---|
| JP | 49-16268 | 4/1974 |
| JP | 49-16269 | 4/1974 |
| JP | 11-502541 A | 3/1999 |

OTHER PUBLICATIONS

Ajellal et al., Functional Elastomers vis Sequential Selective Diene Co-polymerization/Hydrophophorylation Catalysis, Adv. Synth. Catal. 2008, 350 pp. 431-438.*
International Search Report dated Feb. 6, 2018 in PCT/JP2017/047392 filed Dec. 28, 2017.
Butler, G. B. et al., "Linear Polymers from Triene Monomers by the Cyclopolymerization Mechanism. VIII. Nonconjugated Chormophoric Interactions Related to Cyclopolymerization," Linear Polymers from Triene Monomers, vol. 28, 1963, pp. 2699-2703.
Ajellal, N. et al., "Functional Elastomers via Sequential Selective Diene Copolymerization/Hydrophosphorylation Catalysis," Adv. Synth. Catal., vol. 350, 2008, pp. 431-438.

* cited by examiner

*Primary Examiner* — Robert D Harlan
(74) *Attorney, Agent, or Firm* — Oblon, McClelland, Maier & Neustadt, L.L.P.

(57) ABSTRACT

The present invention provides a 1,3,7-octatriene polymer having a narrow molecular weight distribution and a hydride thereof. Specifically, the 1,3,7-octatriene polymer is a polymer containing a structural unit derived from 1,3,7-octatriene, wherein the polymer has not only a molecular weight distribution (Mw/Mn) of 2.05 or less but also a weight average molecular weight (Mw) of 1,000 to 1,000,000.

22 Claims, No Drawings

1,3,7-OCTATRIENE POLYMER, HYDRIDE THEREOF, AND METHOD FOR PRODUCING SAID POLYMER

FIELD OF THE INVENTION

The present invention relates to a 1,3,7-octatriene polymer and a hydride thereof, and to a method of producing the polymer.

BACKGROUND OF THE INVENTION

For producing films, adhesives, elastic bodies, fibers, foamed bodies, and so on, it is preferred to use a flexible, elastic, and tough polymer, and it is known that a polymer having a glass transition temperature lower than a use temperature thereof (usually a room temperature, e.g., about 25° C.) is suitable. As the polymer having a glass transition temperature lower than room temperature, a thermoplastic resin is exemplified, and as a raw material of the thermoplastic resin, butadiene which is inexpensive and easily utilizable is frequently utilized. However, in order to improve physical properties of the films, adhesives, elastic bodies, fibers, foamed bodies, and so on, there is a limit because the same raw material is used, and therefore, conjugated diene compounds which are not often used so far are interested. 1,3,7-Octatriene is one of such conjugated diene compounds.

A polymer containing a structural unit derived from 1,3,7-octatriene has a terminal double bond in a side chain thereof, and therefore, it can be denatured through various reactions, for example, epoxidation, halogenation, and graft polymerization with other low-molecular compound. In addition, maleic anhydride, acrolein, or the like can also be added while utilizing reactivity of the double bond existing in the polymer. The thus-obtained chemically denatured polymer is expected to be spread as a functional material, such as an adhesive and a lubricating agent.

However, there are very few reported cases regarding polymers containing a structural unit derived from 1,3,7-octatriene. For example, there is disclosed a polymerization method of 1,3,7-octatriene by using an anionic polymerization initiator (see PTL 1). However, influences of the purity of 1,3,7-octatriene on the molecular weight and molecular weight distribution of the obtained polymer and the polymerization results are not mentioned at all.

In addition, there is disclosed a polymerization method of 1,3,7-octatriene by using a cationic polymerization initiator (see PTL 2). However, as a result of experiments for corroboration made by the present inventors, the molecular weight distribution of the obtained polymer was broad as 3.17, and it was difficult to control the polymerization (see Comparative Example 4 of this specification).

There is disclosed a polymerization method of 1,3,7-octatriene by using a titanium-based Ziegler-type catalyst (see NPL 1). However, the obtained polymer has a cross-linked structure, and the polymerization control cannot be achieved.

In addition, there is disclosed a polymerization method of 1,3,7-octatriene by using a neodymium-based Ziegler-type catalyst (see NPL 2). However, the molecular weight distribution of the obtained polymer is broad as 2.06, and the polymerization control cannot be achieved.

CITATION LIST

Patent Literature

PTL 1: JP 49-16269 B
PTL 2: JP 49-16268 B

Non-Patent Literature

NPL 1: The Journal of Organic Chemistry, Vol. 28, pp. 2699-2703 (1963)
NPL 2: Advanced Synthesis & Catalysis, Vol. 350, pp. 431-438 (2008)

SUMMARY OF INVENTION

Technical Problem

In order to enhance mechanical properties of a polymer, it is generally known that it is suitable to make the molecular weight distribution (Mw/Mn) narrow. In consequence, a problem of the present invention is to provide a 1,3,7-octatriene polymer having a narrow molecular weight distribution, which has not hitherto been produced, a hydride thereof, and a method of producing the polymer.

Solution to Problem

As a result of extensive and intensive investigations made by the present invention, it has been found that a cause of the difficulty of polymerization control resides in not 1,3,7-octatriene per se but impurities contained in 1,3,7-octatriene; and that by using 1,3,7-octatriene having a purity of more than 98.0%, the aforementioned problem can be solved, thereby leading to accomplishment of the present invention.

Specifically, the present invention provides the following [1] to [22].

[1] A polymer containing a structural unit derived from 1,3,7-octatriene, the polymer having not only a molecular weight distribution (Mw/Mn) of 2.05 or less but also a weight average molecular weight (Mw) of 1,000 to 1,000,000.
[2] The polymer as set forth in the above [1], wherein the weight average molecular weight (Mw) is from 4,000 to 500,000.
[3] The polymer as set forth in the above [1] or [2], wherein the weight average molecular weight (Mw) is from 7,000 to 200,000.
[4] The polymer as set forth in any of the above [1] to [3], wherein the weight average molecular weight (Mw) is from 13,000 to 200,000.
[5] The polymer as set forth in any of the above [1] to [4], wherein the molecular weight distribution (Mw/Mn) is 1.80 or less.
[6] The polymer as set forth in any of the above [1] to [5], wherein the structural unit derived from 1,3,7-octatriene is contained in an amount of 95 mol % or more.
[7] The polymer as set forth in any of the above [1] to [6], not having a living anionic active species at a molecular end thereof.
[8] The polymer as set forth in any of the above [1] to [6], having a living anionic active species at a molecular end thereof.

[9] A hydride of the polymer as set forth in any of the above [1] to [7].

[10] A method of producing a polymer containing a structural unit derived from 1,3,7-octatriene, the method including a step of subjecting 1,3,7-octatriene having a purity, as determined by gas chromatography, of more than 98.0% to anionic polymerization, wherein
the polymer has not only a molecular weight distribution (Mw/Mn) of 2.05 or less but also a weight average molecular weight (Mw) of 1,000 to 1,000,000.

[11] The method of producing a polymer as set forth in the above [10], wherein impurities which may be contained in the 1,3,7-octatriene include at least one selected from the group consisting of a peroxide and its decomposition product, and a total content of the peroxide and its decomposition product in the 1,3,7-octatriene is 0.30 mmol/kg or less.

[12] The method of producing a polymer as set forth in the above [10] or [11], wherein the purity of the 1,3,7-octatriene as determined by gas chromatography is 99.0% or more.

[13] The method of producing a polymer as set forth in any of the above [10] to [12], wherein the anionic polymerization is carried out in the presence of a Lewis base.

[14] The method of producing a polymer as set forth in the above [13], wherein a molar ratio of the Lewis base to a polymerization initiator used for the anionic polymerization [(Lewis base)/(polymerization initiator)] is from 0.01 to 1,000.

[15] The method of producing a polymer as set forth in the above [13] or [14], wherein the Lewis base is a compound having at least one selected from the group consisting of an ether bond and a tertiary amino group in a molecule thereof.

[16] The method of producing a polymer as set forth in any of the above [13] to [15], wherein the Lewis base is a compound having one atom having an unshared electron pair.

[17] The method of producing a polymer as set forth in any of the above [13] to [15], wherein the Lewis base is a compound having two or more atoms having an unshared electron pair.

[18] The method of producing a polymer as set forth in the above [171], wherein the Lewis base has multidentate properties.

[19] The method of producing a polymer as set forth in any of the above [10] to [18], wherein a solid content concentration of a reaction liquid obtained after completion of the anionic polymerization is from 10 to 80% by mass.

[20] The method of producing a polymer as set forth in any of the above [10] to [19], wherein the anionic polymerization is carried out at −50 to 200° C.

[21] The method of producing a polymer as set forth in any of the above [10] to [20], wherein a conversion of the 1,3,7-octatriene after completion of the anionic polymerization, as determined by gas chromatography, is 80.0% or more.

[22] The method of producing a polymer as set forth in any of the above [10] to [21], wherein a conversion of the 1,3,7-octatriene after completion of the anionic polymerization, as determined by gas chromatography, is 97.0% or more.

Advantageous Effects of Invention

In accordance with the present invention, it is possible to provide a polymer of 1,3,7-octatriene, the polymer having not only a molecular weight distribution (Mw/Mn) of 2.05 or less but also a weight average molecular weight (Mw) of 1,000 to 1,000,000, and a hydride thereof.

DESCRIPTION OF EMBODIMENTS

Hereinafter, all of embodiments in which the items mentioned in this specification are arbitrarily combined are included in the present invention. In addition, a lower limit value and an upper limit value in a numerical value range may be arbitrarily combined with a lower limit value and an upper limit value in other numerical value range, respectively.

[Polymer of 1,3,7-Octatriene]

The present invention relates to a polymer containing a structural unit derived from 1,3,7-octatriene, the polymer having not only a molecular weight distribution (Mw/Mn) of 2.05 or less but also a weight average molecular weight (Mw) of 1,000 to 1,000,000.

In the present invention, the weight average molecular weight (Mw) and the number average molecular weight (Mn) are each a molecular weight as expressed in terms of standard polystyrene as determined by means of gel permeation chromatography (GPC) measurement, and more specifically, they are each a value as measured by the measurement method described in the section of Examples. In addition, the molecular weight distribution (Mw/Mn) is a value as calculated therefrom.

In the case of incorporating the polymer of the present invention in a composition, in order to suppress bleed-out of the polymer, it is preferred that not only the weight average molecular weight (Mw) of the polymer of the present invention is high, but also the molecular weight distribution (Mw/Mn) thereof is narrow. But, in general, when the weight average molecular weight (Mw) is made high, the molecular weight distribution (Mw/Mn) tends to become broad. When the molecular weight distribution (Mw/Mn) is broad, a low molecular weight material coexists, thereby possibly causing the bleed-out. On the other hand, the present invention is able to provide a polymer in which the molecular weight distribution (Mw/Mn) is kept narrow, and therefore, its industrial value is large.

The polymer of the present invention can be produced by using, as a raw material, 1,3,7-octatriene having a purity of more than 98.0%. In particular, the polymer of the present invention can be produced by performing anionic polymerization using such a raw material.

In the case where the conversion of 1,3,7-octatriene is high, it becomes simple and easy to perform separation and recovery of the polymer from the raw material. Furthermore, there is no concern that unreacted 1,3,7-octatriene is hydrogenated and converted into octane having an inexpensive unit price, and therefore, such is industrially preferred from the standpoint that an obtained polymer can be subjected to hydrogenation reaction, etc. directly without going through a separation step. For that reason, it is preferred to achieve a high raw material conversion for a short polymerization time. In the present invention, by using a raw material having not only a purity of more than 98.0% but also a total content of a peroxide and its decomposition product of 0.30 mmol/kg or less, there is a tendency that a high raw material conversion is readily achieved for a short polymerization time.

The purity of 1,3,7-octatriene is preferably 98.5% or more, more preferably 98.8% or more, and still more preferably 99.0% or more. Here, in the present invention, the purity of 1,3,7-octatriene is obtained by calculating the sum total of peak areas capable of being assigned to the whole of octatrienes by means of an analysis of gas chromatography and determining a percentage of a peak area of 1,3,7-octatriene relative to the sum total of these peak areas, and more specifically, it is one determined by a method described in the section of Examples. Here, the whole of octatrienes means all of 1,3,7-octatriene and double bond isomers thereof, such as 1,3,6-octatriene, 2,4,6-octatriene, and 1,4,6-octatriene, Examples of the impurities which may be included in 1,3,7-octatriene include at least one selected from the group consisting of a peroxide and its decomposition product. A total content of the peroxide and its decomposition product in the 1,3,7-octatriene is preferably 0.30 mmol/kg or less, more preferably 0.15 mmol/kg or less, and still more preferably 0.10 mmol/kg or less (provided that one of them may be 0 mmol/kg). Here, in the present invention, the total content of the peroxide and its decomposition product in the 1,3,7-octatriene is a value determined by titrating iodine ($I_2$) generated by allowing potassium iodide to act on 1,3,7-octatriene with sodium thiosulfate, and more specifically, it is one determined by a method described in the section of Examples. Examples of the peroxide include 5-hydroperoxy-1,3,7-octatriene and 6-hydroperoxy-1,3,7-octatriene. In addition, though the decomposition product of a peroxide is not particularly limited so long as it is a compound capable of being produced through decomposition of 5-hydroperoxy-1,3,7-octatriene or 6-hydroperoxy-1,3,7-octatriene, examples thereof include 5-hydroxy-1,3,7-octatriene and 6-hydroxy-1,3,7-octatriene. These are impurities which may be produced through oxygen oxidation of 1,3,7-octatriene. As the peroxide and its decomposition product, in particular, 5-hydroperoxy-1,3,7-octatriene, 6-hydroperoxy-1,3,7-octatriene, 5-hydroxy-1,3,7-octatriene, and 6-hydroxy-1,3,7-octatriene are an important compound.

As for the 1,3,7-octatriene, it is extremely difficult to perform distillation separation from a by-product, for example, 4-vinylcyclohexene and 1,3,6-octatriene, and therefore, in general, 1,3,7-octatriene having a purity of more than 98.0% is not easily obtainable, and its purity is typically liable to be 97% or less. But, by carrying out the method described in JP 2016-216385 A or JP 47-17703 A, it is possible to produce 1,3,7-octatriene having a purity of more than 98.0%, and in the present invention, this 1,3,7-octatriene can be utilized in the present invention. Nevertheless the 1,3,7-octatriene having a purity of more than 98.0% exists like this, those skilled in the art recognized that to begin with, the polymerization control of 1,3,7-octatriene is difficult, and therefore, they have not hitherto considered carrying out the polymerization reaction using, as the raw material, 1,3,7-octatriene whose purity has been especially increased to more than 98.0%. However, during the development made by the present inventors regarding the polymer containing a structural unit derived from 1,3,7-octatriene, it has been found that the polymer of the present invention can be produced for a short time at a high conversion by using, as the raw material, 1,3,7-octatriene having a purity of more than 98.0%, in particular, 1,3,7-octatriene having not only a purity of more than 98.0% but also a total content of a peroxide and its decomposition product of 0.30 mmol/kg or less.

With respect to the polymer of the present invention, a weight average molecular weight (Mw) thereof is preferably 1,000 to 1,000,000, more preferably 4,000 to 500,000, still more preferably 7,000 to 200,000, and especially preferably 13,000 to 200,000. In addition, the Mw may be 19,000 to 1,000,000, may be 33,000 to 500,000, may be 71,000 to 500,000, and may be 71,000 to 250,000.

A molecular weight distribution (Mw/Mn) of the polymer of the present invention is 2.05 or less, preferably 2.03 or less, more preferably 2.00 or less, still more preferably 1.90 or less, yet still more preferably 1.80 or less, even yet still more preferably 1.60 or less, even still more preferably 1.50 or less, especially preferably 1.35 or less, and most preferably 1.30 or less. Though a lower limit of the molecular weight distribution (Mw/Mn) is not particularly limited, typically, it is 1.05 or more or 1.10 or more, and it often becomes 1.15 or more.

The polymer of the present invention may contain mainly the structural unit derived from 1,3,7-octatriene. The content is preferably 95 mol % or more, more preferably 97 mol % or more, still more preferably 98 mol % or more, especially preferably more than 98 mol %, and most preferably 99.0 mol % or more relative to the whole of structural units of the polymer (provided that a structural unit derived from a chain terminator as mentioned later is excluded). It may be said that the polymer of the present invention is a homopolymer of 1,3,7-octatriene so long as impurities in 1,3,7-octatriene that is the raw material monomer, modification as mentioned later, and a coupling agent as mentioned later are not taken into consideration.

The polymer of the present invention may or may not be denatured through copolymerization with an anionic polymerizable compound. In the case where the polymer of the present invention is denatured with an anionic polymerizable compound, the content of the structural unit derived from the anionic polymerizable compound is preferably 5 mol % or less, and more preferably 3 mol % or less in the whole of structural units.

The anionic polymerizable compound is not particularly limited so long as it is a compound other than 1,3,7-octatriene and is a compound capable of undergoing anionic polymerization. Examples thereof include aromatic vinyl compounds, such as styrene, 2-chlorostyrene, 4-chlorostyrene, α-methylstyrene, α-methyl-4-methylstyrene, 2-methylstyrene, 3-methylstyrene, 4-methylstyrene, 2,4-dimethylstyrene, 2,5-dimethylstyrene, 3,4-dimethylstyrene, 3,5-dimethylstyrene, 2-ethylstyrene, 3-ethylstyrene, 4-ethylstyrene, 4-n-propylstyrene, 4-isopropylstyrene, 4-tert-butylstyrene, 4-cyclohexylstyrene, 4-dodecylstyrene, 2-ethyl-4-benzylstyrene, 4-(4-phenyl-n-butyl)styrene, 1-vinylnaphthalene, 2-vinylnaphthalene, 1,1-diphenylethylene, N,N-dimethyl-p-aminoethylstyrene, N,N-diethyl-p-aminoethylstyrene, 1,2-divinylbenzene, 1,3-divinylbenzene, 1,4-divinylbenzene, 1,2-divinyl-3,4-dimethylbenzene, 2,4-divinylbiphenyl, 1,3-divinylnaphthalene, 1,2,4-trivinylbenzene, 3,5,4'-trivinylbiphenyl, 1,3,5-trivinylnaphthalene, and 1,5,6-trivinyl-3,7-diethylnaphthalene; α,β-unsaturated nitriles, such as acrylonitrile, methacrylonitrile, and ethacrylonitrile; α,β-unsaturated carboxylic acids, such as acrylic acid, methacrylic acid, crotonic acid, 3-methylcrotonic acid, 3-butenoic acid, maleic acid, fumaric acid, itaconic acid, citraconic acid, and mesaconic acid; α,β-unsaturated carboxylic acid esters, such as methyl acrylate, ethyl acrylate, propyl acrylate, butyl acrylate, sec-butyl acrylate, tert-butyl acrylate, hexyl acrylate, 2-ethylhexyl acrylate, lauryl acrylate, stearyl acrylate, methyl methacrylate, ethyl methacrylate, propyl methacrylate, isopropyl methacrylate, butyl methacrylate, sec-butyl methacrylate, tert-butyl methacrylate, hexyl methacrylate, 2-ethylhexyl methacrylate, lauryl methacrylate, stearyl methacrylate, dimethyl maleate, diethyl maleate, dibutyl maleate, dimethyl fumarate, diethyl fumarate, dibutyl fumarate, dimethyl itaconate, diethyl itaconate, and dibutyl itaconate; and acrylamides, such as N-methylacrylamide, N-ethylacrylamide, N-propylacrylamide, N-butylacrylamide, N-octylacrylamide, N-phenylacrylamide, N-glycidylacrylamide, N,N'-ethylenebisacrylamide, N,N-dimethylacrylamide, N-ethyl-N-methylacrylamide, N,N-diethylacrylamide, N,N-dipropylacrylamide, N,N-dioctylacrylamide, N,N-diphenylacrylamide, N-ethyl-N-glycidylacrylamide, N,N-diglycidylacrylamide, N-methyl-N-(4-glycidyloxybutyl)acrylamide, N-methyl-N-(5-glycidyloxypentyl)acrylamide, N-methyl-N-(6-glycidyloxyhexyl)acrylamide, N-acryloylpyrrolidine, N-acryloyl-L-proline methyl ester, N-acryloylpiperidine, N-acryloylmorpholine, 1-acryloylimidazole, N,N'-diethyl-N,N'-ethylenebisacrylamide, N,N'-dimethyl-N,N'-hexamethylenebisacrylamide, and di(N, N'-ethylene)bisacrylamide.

The anionic polymerizable compounds may be used alone or may be used in combination of two or more thereof.

The polymer of the present invention may or may not contain a structural unit derived from a coupling agent. In the case where the polymer of the present invention contains a structural unit derived from a coupling agent, the content of the structural unit derived from a coupling agent is preferably 5 mol % or less, and more preferably 2 mol % or less in the whole of structural units.

Examples of the coupling agent include dichloromethane, dibromomethane, dichloroethane, dibromoethane, dibromobenzene, and phenyl benzoate.

(Binding Mode)

In the polymer of the present invention, as a representative binding mode of 1,3,7-octatriene, a 1,2-bond, a 3,4-bond, a 1,4-bond, and a 4,1-bond are included, and the binding order and the content ratio of the respective binding modes are not particularly limited. In the present invention, the 1,4-bond and the 4,1-bond are considered to be identical with each other.

The content ratio of the 1,2-bond relative to the whole of binding modes is preferably 35 to 65 mol %, more preferably 40 to 60 mol %, and still more preferably 40 to 50 mol %. The content ratio of the 1,4-bond relative to the whole of binding modes is preferably 20 to 65 mol %, more preferably 40 to 60 mol %, and still more preferably 40 to 50 mol %. Taking into consideration the aforementioned content ratio of the 1,2-bond and the aforementioned content ratio of the 1,4-bond, the content ratio of the 3,4-bond relative to the whole of binding modes becomes the remainder. Namely, the content ratio of the 3,4-bond relative to the whole of binding modes is determined from "100−[(content ratio of the 1,2-bond)+(content ratio of the 1,4-bond)]".

The ratio of each of the binding modes is determined by the 3C-NMR measurement. Specifically, it can be determined according to the method described in the section of Examples.

On the occasion of producing the polymer of the present invention through anionic polymerization as mentioned later, the polymer at a stage after allowing a chain terminator to react after the polymerization reaction is a polymer not having a living anionic active species at a molecular end thereof, and the present invention provides the foregoing polymer.

On the occasion of producing the polymer of the present invention through anionic polymerization as mentioned later, the polymer at a stage before allowing a chain terminator to react after the polymerization reaction is a polymer having a living anionic active species at a molecular end thereof (sometimes referred to as "living anionic polymer"), and the present invention also provides the foregoing polymer.

(Hydride)

The polymer of the present invention may also be a hydride of the aforementioned polymer from the viewpoints of heat resistance and weather resistance. In the case where the polymer of the present invention is a hydride, though a hydrogenation rate thereof is not particularly limited, in the polymer, the carbon-carbon double bond is hydrogenated to an extent of preferably 80 mol % or more, more preferably 85 mol % or more, still more preferably 90 mol % or more, especially preferably 93 mol % or more, and most preferably 95 mol % or more. The foregoing value is sometimes referred to as "hydrogenation rate". Though an upper limit value of the hydrogenation rate is not particularly limited, the upper limit value may be 99 mol % or less.

The hydrogenation rate is determined by the $^1$H-NMR measurement of the content of the carbon-carbon double bond after hydrogenation. Specifically, it can be determined according to the method described in the section of Examples.

[Production Method of Polymer]

A production method of a polymer of the present invention is a method of producing a polymer containing a structural unit derived from 1,3,7-octatriene, the method including a step of subjecting 1,3,7-octatriene having a purity, as determined by gas chromatography, of more than 98.0% to anionic polymerization, wherein the polymer has not only a molecular weight distribution (Mw/Mn) of 2.05 or less but also a weight average molecular weight (Mw) of 1,000 to 1,000,000.

As mentioned above, it is preferred that the total content of the aforementioned peroxide and its decomposition is 0.30 mmol/kg or less.

The anionic polymerization method is not particularly limited, and a known anionic polymerization method is applicable.

For example, an anionic polymerization initiator is fed into 1,3,7-octatriene that is the raw material monomer to undergo polymerization reaction, thereby forming a polymer having a living anionic active species in the reaction system. Subsequently, a polymerization terminator is added thereto, thereby producing the polymer of the present invention.

A Lewis base and a solvent may be used, if desired.

For the purpose of suppressing invasion of water and oxygen, etc., which hinder the polymerization reaction, into the reaction system, for example, it is preferred to carry out the polymerization reaction in the interior of a reactor pressurized with an inert gas. When the polymerization reaction is carried out in an inert gas atmosphere, consumption of the anionic polymerization initiator and a growing terminal anion by the reaction with water or oxygen can be suppressed, so that the polymerization reaction can be precisely controlled. Here, the growing terminal anion refers to an anion which the polymer existing in the reaction system during the polymerization reaction has at a molecular end thereof, and hereinafter, the same is applicable.

It is preferred that 1,3,7-octatriene, an anionic polymerization initiator as mentioned later, a Lewis base as mentioned later, a solvent as mentioned later, and so on, all of which are used for the production of a polymer, do not substantially contain substances which react with the growing terminal anion to hinder the polymerization reaction, for example, oxygen, water, a hydroxy compound, a carbonyl compound, and an alkyne compound, and it is preferred that those materials are stored under a shading condition in an inert gas atmosphere of nitrogen, argon, helium, or the like.

Each of 1,3,7-octatriene, the anionic polymerization initiator, the Lewis base, and so on may be used upon being diluted with a solvent or may be used without being diluted with a solvent.

As mentioned above, an important point in the production method of a polymer of the present invention resides in the use of 1,3,7-octatriene having a purity of more than 98.0% (more preferably those as mentioned above), and preferably in the use of 1,3,7-octatriene having not only a purity of more than 98.0% but also a total content of a peroxide and its decomposition product of 0.30 mmol/kg or less (more preferably those as mentioned above).

(Anionic Polymerization Initiator)

The production method of a polymer of the present invention utilizes the anionic polymerization, and therefore, an anionic polymerization initiator is used. The anionic polymerization initiator is not limited in terms of its kind so long as it is able to initiate the anionic polymerization.

As the anionic polymerization initiator, an organic alkali metal compound which is generally used in anionic polymerization of an aromatic vinyl compound and a conjugated diene compound can be used. Examples of the organic alkali metal compound include organic lithium compounds, such as methyllithium, ethyllithium, propyllithium, isopropyllithium, butyllithium, sec-butyllithium, tert-butyllithium, isobutyllithium, pentyllithium, hexyllithium, butadienyllithium, cyclohexyllithium, phenyllithium, benzyllithium, p-toluyllithium, styryllithium, trimethylsilyllithium, 1,4-dilithiobutane, 1,5-dilithiopentane, 1,6-dilithiohexane, 1,10-dilithiodecane, 1,1-dilithiodiphenylene, dilithiopolybutadiene, dilithiopolyisoprene, 1,4-dilithiobenzene, 1,2-dilithio-1,2-diphenylethane, 1,4-dilithio-2-ethylcyclohexane, 1,3,5-trilithiobenzene, and 1,3,5-trilithio-2,4,6-triethylbenzene; and organic sodium compounds, such as methylsodium, ethylsodium, n-propylsodium, isopropylsodium, n-butylsodium, sec-butylsodium, tert-butylsodium, isobutylsodium, phenylsodium, sodium naphthalene, and cyclopentadienylsodium. Above all, n-butyllithium and sec-butyllithium are preferred. The organic alkali metal compounds may be used alone or may be used in combination of two or more thereof.

Though the use amount of the anionic polymerization initiator can be properly set according to the desired weight average molecular weight of the polymer or solid content concentration of the reaction liquid, for example, a molar ratio of the use amount of raw material monomers to the anionic polymerization initiator is preferably 10 to 3,000, more preferably 50 to 2,500, still more preferably 100 to 2,500, yet still more preferably 100 to 1,500, and especially preferably 100 to 1,000.

(Lewis Base)

In the production method of a polymer of the present invention, from the viewpoint of controlling the polymerization reaction, in particular, from the viewpoint of obtaining a high conversion of 1,3,7-octatriene for a short time, a Lewis base may be used, and it is preferred to use a Lewis base. The Lewis base is not particularly limited in terms of its kind so long as it is an organic compound which does not substantially react with the anionic polymerization initiator and the growing terminal anion.

In the case of using the Lewis base, a molar ratio of the Lewis base to the polymerization initiator (anionic polymerization initiator) to be used for the anionic polymerization [(Lewis base)/(polymerization initiator)] is preferably 0.01 to 1,000, more preferably 0.01 to 400, still more preferably 0.1 to 200, yet still more preferably 0.1 to 50, and especially preferably 0.1 to 22. When the foregoing molar ratio falls within this range, a high conversion of 1,3,7-octatriene is readily achieved for a short time.

As the Lewis base, there is exemplified (i) a compound having at least one selected from the group consisting of an ether bond and a tertiary amino group in a molecule thereof [hereinafter referred to as "Lewis base (i)"]. Examples of the Lewis base (i) include (i-1) a compound having one atom having an unshared electron pair [hereinafter referred to as "Lewis base (i-1)"] and (i-2) a compound having two or more atoms having an unshared electron pair [hereinafter referred to as "Lewis base (i-2)"].

The Lewis base may be one having monodentate properties or may be one having multidentate properties. In addition, the Lewis base may be used alone or may be used in combination of two or more thereof.

(Lewis Base (i))

In the Lewis base (i), specific examples of the Lewis base (i-1) include non-cyclic monoethers, such as dimethyl ether, methyl ethyl ether, diethyl ether, ethyl propyl ether, dipropyl ether, diisopropyl ether, butyl methyl ether, tert-butyl methyl ether, dibutyl ether, dioctyl ether, ethyl phenyl ether, and diphenyl ether; cyclic monoethers having preferably 2 to 40 carbon atoms in total (more preferably 2 to 20 carbon atoms in total), such as tetrahydrofuran and tetrahydropyran; and tertiary monoamines having preferably 3 to 60 carbon atoms in total (more preferably 3 to 15 carbon atoms in total), such as trimethylamine, triethylamine, tripropylamine, triisopropylamine, tributylamine, triisobutylamine, tri-sec-butylamine, tri-tert-butylamine, tri-tert-hexylamine, tri-tert-octylamine, tri-tert-decylamine, tri-tert-dodecylamine, tri-tert-tetradecylamine, tri-tert-hexadecylamine, tri-tert-octadecylamine, tri-tert-tetracosanylamine, tri-tert-octacosanylamine, 1-methyl-1-amino-cyclohexane, tripentylamine, triisopentylamine, trineopentylamine, trihexylamine, triheptylamine, trioctylamine, triphenylamine, tribenzylamine, N,N-dimethylethylamine, N,N-dimethylpropylamine, N,N-dimethylisopropylamine, N,N-dimethylbutylamine, N,N-dimethylisobutylamine, N,N-dimethyl-sec-butylamine, N,N-dimethyl-tert-butylamine, N,N-dimethylpentylamine, N,N-dimethylisopentylamine, N,N-dimethylneopentylamine, N,N-dimethylhexylamine, N,N-dimethylheptylamine, N,N-dimethyloctylamine, N,N-dimethylnonylamine, N,N-dimethyldecylamine, N,N-dimethylundecylamine, N,N-dimethyldodecylamine, N,N-dimethylphenylamine, N,N-dimethylbenzylamine, N,N-diethylmonomethylamine, N,N-dipropylmonomethylamine, N,N-diisopropylmonomethylamine, N,N-dibutylmonomethylamine, N,N-diisobutylmonomethylamine, N,N-di-sec-butylmonomethylamine, N,N-di-tert-butylmonomethylamine, N,N-dipentylmonomethylamine, N,N-diisopentylmonomethylamine, N,N-dineopentylmonomethylamine, N,N-dihexylmonomethylamine, N,N-diheptylmonomethylamine, N,N-dioctylmonomethylamine, N,N-dinonylmonomethylamine, N,N-didecylmonomethylamine, N,N-diundecylmonomethylamine, N,N-didodecylmonomethylamine, N,N-diphenylmonomethylamine, N,N-dibenzylmonomethylamine, N,N-dipropylmonomethylamine, N,N-diisopropylmonoethylamine, N,N-dibutylmonoethylamine, N,N-diisobutylmonoethylamine, N,N-di-sec-butylmonoethylamine, N,N-di-tert-butylmonoethylamine, N,N-dipentylmonoethylamine, N,N-diisopentylmonoethylamine, N,N-dineopentylmonoethylamine, N,N-dihexylmonoethylamine, N,N-diheptylmonoethylamine, N,N-dioctylmonoethylamine, N,N-dinonylmonoethylamine, N,N-didecylmonoethylamine, N,N-diundecylmonoethylamine, N,N-didodecylmonoethylamine, N,N-diphenylmonoethylamine, N,N-dibenzylmonoethylamine, N,N-dimethylaniline, N,N-diethylaniline, N-ethylpiperazine, N-methyl-N-ethylaniline, and N-methylmorpholine.

The Lewis base (i-1) is a Lewis base having monodentate properties to the metal atom of the anionic polymerization initiator.

From the viewpoint of controlling the polymerization reaction, in particular, from the viewpoint of obtaining a high conversion of 1,3,7-octatriene for a short time, diethyl ether, diisopropyl ether, tetrahydrofuran, tetrahydropyran, triethylamine, and N,N-dimethylethylamine are preferred as the Lewis base (i-1).

In the case of using the Lewis base (i-1), a molar ratio of the atom having an unshared electron pair in the Lewis base (i-1) to the metal atom of the polymerization initiator used for the anionic polymerization [(atom having an unshared electron pair)/(metal atom of polymerization initiator)] is preferably 0.01 to 1,000, more preferably 0.1 to 500, still more preferably 2 to 300, especially preferably 2 to 100, and most preferably 2 to 50. When the foregoing molar ratio falls within this range, a high conversion of 1,3,7-octatriene is readily achieved for a short time.

In the Lewis base (i), specific examples of the Lewis base (i-2) include non-cyclic diethers having preferably 4 to 80 carbon atoms in total (more preferably 4 to 40 carbon atoms in total), such as 1,2-dimethoxyethane, 1,2-diethoxyethane, 1,2-diisopropoxyethane, 1,2-dibutoxyethane, 1,2-diphenoxyethane, 1,2-dimethoxypropane, 1,2-diethoxypropane, 1,2-diphenoxypropane, 1,3-dimethoxypropane, 1,3-diethoxypropane, 1,3-diisopropoxypropane, 1,3-dibutoxypropane, and 1,3-diphenoxypropane; cyclic diethers having preferably 4 to 80 carbon atoms in total (more preferably 4 to 40 carbon atoms in total), such as 1,4-dioxane and 2,2-di(tetrahydrofuryl)propane; non-cyclic polyethers having preferably 6 to 40 carbon atoms in total (more preferably 6 to 20 carbon atoms in total), such as diethylene glycol dimethyl ether, dipropylene glycol dimethyl ether, dibutylene glycol dimethyl ether, diethylene glycol diethyl ether, dipropylene glycol diethyl ether, dibutylene glycol diethyl ether, triethylene glycol dimethyl ether, tripropylene glycol dimethyl ether, tributylene glycol dimethyl ether, triethylene glycol diethyl ether, tripropylene glycol diethyl ether, tributylene glycol diethyl ether, tetraethylene glycol dimethyl ether, tetrapropylene glycol dimethyl ether, tetrabutylene glycol dimethyl ether, tetraethylene glycol diethyl ether, tetrapropylene glycol diethyl ether, and tetrabutylene glycol diethyl ether; and polyamines having preferably 6 to 122 carbon atoms in total (more preferably 6 to 32 carbon atoms in total, and still more preferably 6 to 15 carbon atoms in total), such as N,N,N',N'-tetramethylethylenediamine, N,N,N',N'-tetraethylethylenediamine, N,N,N,N'',N''-pentamethyldiethylenetriamine, and tris[2-(dimethylamino)ethyl]amine.

The Lewis base (i-2) includes a Lewis base having monodentate properties to the metal atom of the anionic polymerization initiator and a Lewis base having multidentate properties to the metal atom of the anionic polymerization initiator.

From the viewpoint of controlling the polymerization reaction, in particular, from the viewpoint of obtaining a high conversion of 1,3,7-octatriene for a short time, 1,2-dimethoxyethane, 1,2-diethoxyethane, 1,2-diisopropoxyethane, 2,2-di(tetrahydrofuryl)propane, N,N,N',N'-tetramethylethylenediamine, and N,N,N',N'-tetraethylethylenediamine are preferred as the Lewis base (i-2).

In the case of using the Lewis base (i-2), the Lewis base having monodentate properties to the metal atom of the anionic polymerization initiator and the Lewis base having multidentate properties (for example, bidentate properties) to the metal atom of the anionic polymerization initiator are different from each other with respect to a preferred use amount. The Lewis base (i-2) has two or more atoms having an unshared electron pair. In this regard, when attention is paid to two atoms having an unshared electron pair, in the case where the shortest crosslinked carbon number connecting them is 1 (for example, —O—$CH_2$—O— and >N—$CH_2$—N<) or 3 or more (for example, —O—$C_3H_6$—O—, >N—$C_4H_8$—N<, and —O—$C_3H_6$—N<), each of the atoms tends to have monodentate properties. On the other hand, when attention is similarly paid to two atoms having an unshared electron pair, in the case where the shortest crosslinked carbon number connecting them is 2 (for example, —O—$C_2H_4$—O— and >N—$C_2H_4$—N<), there is a tendency that the two atoms having those unshared electron pairs are subjected to a multidentate arrangement (bidentate arrangement) to one metal atom of the anionic polymerization initiator.

In the case where the Lewis base (i-2) is a Lewis base having monodentate properties, a molar ratio of the atom having an unshared electron pair in the Lewis base (i-2) to the metal atom of the polymerization initiator to be used for the anionic polymerization [(atom having an unshared electron pair)/(metal atom of polymerization initiator)] is preferably 0.01 to 1,000, more preferably 0.1 to 500, still more preferably 2 to 300, especially preferably 2 to 100, and most preferably 2 to 50. When the foregoing molar ratio falls within this range, a high conversion of 1,3,7-octatriene is readily achieved for a short time.

On the other hand, in the case where the Lewis base (i-2) is a Lewis base having multidentate properties (bidentate properties), a molar ratio of the atom having an unshared electron pair in the Lewis base (i-2) to the metal atom of the polymerization initiator to be used for the anionic polymerization [(atom having an unshared electron pair)/(metal atom of polymerization initiator)] is preferably 0.01 to 50, more preferably 0.1 to 10, still more preferably 0.1 to 5, and especially preferably 0.3 to 4. When the foregoing molar ratio falls within this range, a high conversion of 1,3,7-octatriene is readily achieved for a short time.

In the case of a Lewis base having both monodentate properties and multidentate properties (bidentate properties), it is preferred to determine the use amount of the Lewis base by combing an atom having unshared electron pair having monodentate properties with two or more atoms having unshared electron pair having multidentate properties (bidentate properties), paying attention thereto, and referring to the aforementioned description.

(Solvent)

Though the production method of a polymer of the present invention can be carried out in the absence of a solvent, for the purpose of efficiently removing polymerization heat, it is preferred to carry out the production in the presence of a solvent.

Though the solvent is not particularly limited in terms of its kind so long as it does not substantially react with the anionic polymerization initiator and the growing terminal anion, a hydrocarbon-based solvent is preferred from the viewpoint of precisely controlling the polymerization time and the conversion with the Lewis base.

Examples of the hydrocarbon-based solvent include saturated aliphatic hydrocarbons, such as isopentane (27.9° C.; a boiling point at 1 atm, hereinafter the same), pentane (36.1° C.), cyclopentane (49.3° C.), hexane (68.7° C.), cyclohexane (80.7° C.), heptane (98.4° C.), isoheptane (90° C.), isooctane (99° C.), 2,2,4-trimethylpentane (99° C.), methylcyclohexane (101.1° C.), cycloheptane (118.1° C.), octane (125.7° C.), ethylcyclohexane (132° C.), methylcycloheptane (135.8° C.), nonane (150.8° C.), and decane (174.1° C.); and aromatic hydrocarbons, such as benzene (80.1° C.), toluene (110.6° C.), ethylbenzene (136.2° C.), p-xylene (138.4° C.), m-xylene (139.1° C.), o-xylene (144.4° C.), propylbenzene (159.2° C.), and butylbenzene (183.4° C.).

When a solvent having a boiling point of lower than that of 1,3,7-octatriene (boiling point: 125.5° C.) that is one of the raw material monomers is used, the polymerization heat can be efficiently removed by means of reflux condensation cooling of the solvent, and hence, such is preferred. From this viewpoint, isopentane (27.9° C.), pentane (36.1° C.), cyclopentane (49.3° C.), hexane (68.7° C.), cyclohexane (80.7° C.), heptane (98.4° C.), isoheptane (90° C.), isooctane (99° C.), 2,2,4-trimethylpentane (99° C.), methylcyclohexane (101.1° C.), cycloheptane (118.10° C.), benzene (80.1° C.), and toluene (110.6° C.) are preferred. Above all, from the same viewpoint, cyclohexane and n-hexane are more preferred.

The solvents may be used alone or may be used in combination of two or more thereof.

Though the use amount of the solvent is not particularly limited, it is regulated such that a solid content concentration of the reaction liquid obtained after completion of the anionic polymerization is preferably 10 to 80% by mass, more preferably 10 to 70% by mass, still more preferably 15 to 65% by mass, especially preferably 15 to 55% by mass, and most preferably 25 to 55% by mass. In addition, it is preferred to regulate the use amount of the solvent such that a concentration of the living anionic polymer in the reaction system is 5% by mass or more, and it is more preferred to regulate the use amount of the solvent such that the concentration of the living anionic polymer is 10 to 80% by mass. When the solvent is used in such an amount, the removal of polymerization heat can be achieved at a level suited for industrial production, and therefore, not only the polymerization time is readily shortened, but also a high conversion of 1,3,7-octatriene is readily achieved. Furthermore, when the solvent is used in such an amount, the molecular weight distribution is readily made narrow.

From the viewpoint of making the step of removing the solvent simple, the concentration of the solid content in the reaction liquid after completion of anionic polymerization may be adjusted to 35 to 80% by mass, and may be adjusted to 50 to 70% by mass.

(Reactor)

A type of a reactor is not particularly limited, a complete mixing type reactor, a tubular reactor, and a reaction apparatus in which two or more of these reactors are connected in series or in parallel can be used. From the viewpoint of producing a polymer having a narrow molecular weight distribution (Mw/Mn) at a high solution viscosity, it is suitable to use a complete mixing type reactor. Though an impeller of the reactor is not particularly limited, examples thereof include a max blend blade, a full-zone blade, a paddle blade, a propeller blade, a turbine blade, a fan turbine blade, a Pfaudler blade, and a blue margin blade, and a combination of any two or more thereof may also be used. In the case where the viscosity of the obtained polymer solution is high, from the viewpoints of making the molecular weight distribution (Mw/Mn) narrow and promoting the jacket heat removal, it is preferred to use a max blend blade or a full-zone blade.

An agitation method may be either upper portion agitation or lower portion agitation.

A polymerization method is not particularly limited, and it may be carried out by all of batch, semi-batch, and continuous systems. For the purpose of heating and cooling of the solution in the inside of the reactor, the complete mixing type reactor may be provided with a jacket in the outside thereof, and a structure thereof is not particularly limited, and a known system can be adopted. In addition, for the purpose of increasing cooling heat transfer, if desired, a cooling baffle or a cooling coil, etc. may be attached to the inside of the reactor. Furthermore, a direct or indirect type reflux condenser may be attached to a gas phase portion. From the viewpoint of controlling the removal amount of polymerization heat, the reactor may be pressurized with an inert gas, or may be evacuated to atmospheric pressure or lower. In the case of reducing the internal pressure of the reactor to atmospheric pressure or lower, a pump for venting the inert gas may be installed via the reflux condenser. Though a structure of the reflux condenser is not particularly limited, it is preferred to use a multitubular reflux condenser. As for the reflux condenser, plural reflux condensers may be connected in series or in parallel, and a different coolant may be made to pass through each of the reflux condensers. A temperature of the colorant which is made to pass through the reflux condenser is not particularly limited within a range of from a temperature at which the solvent to be refluxed is not frozen to the reaction liquid temperature; however, so long as it is preferably −20 to 50° C., and more preferably 5 to 30° C., a large-sized refrigerating machine is not needed, and hence, such is economical.

(Polymerization Temperature)

Though the polymerization temperature is not particularly limited, it is preferred to carry out the polymerization within a range of from a temperature equal to or higher than the freezing points of the chemicals to a temperature equal to or lower than the temperatures at which the chemicals are not heat-decomposed. So long as the polymerization temperature is preferably −50 to 200° C., more preferably −20 to 120° C., and still more preferably 15 to 100° C., a polymer having excellent mechanical properties, which is capable of suppressing production of a low-molecular weight polymer to be caused due to partial thermal degradation of the growing terminal anion, can be produced while shortening the polymerization time and keeping the high conversion of 1,3,7-octatriene.

(Polymerization Pressure)

The polymerization of the present invention can be suitably carried out so long as incorporation of a substance which reacts with the growing terminal anion to hinder the polymerization reaction, for example, the air containing oxygen and water, is suppressed.

In the case of using a solvent having a boiling point equal to or lower than the polymerization temperature, the temperature may be controlled by controlling the pressure with an inert gas to control the generation amount of a solvent vapor, or in the case of using a solvent having a boiling point higher than the polymerization temperature, the temperature may be controlled by reducing the pressure in the reaction system by using a vacuum pump to control the generation amount of a vapor of the solvent.

Though the polymerization pressure is not particularly limited, so long as it is 0.01 to 10 MPaG, and more preferably 0.1 to 1 MPaG, not only the use amount of the inert gas is reduced, but also a high pressure-resistant reactor and a pump of venting the inert gas outside the system become unnecessary, and hence, the polymerization can be performed economically advantageously.

(Polymerization Time)

Though the polymerization time is not particularly limited, so long as it is preferably 0.1 to 24 hours, and more preferably 0.5 to 12 hours, a polymer having excellent mechanical properties, which is capable of suppressing production of a low-molecular weight polymer to be caused due to partial thermal degradation of the growing terminal anion, is readily produced.

(Polymerization Terminator and Coupling Agent)

In the production method of a polymer of the present invention, it is preferred to add a polymerization terminator to the reaction system, thereby terminating the polymerization reaction. Examples of the polymerization terminator include a hydrogen molecule; an oxygen molecule; water; alcohols, such as methanol, ethanol, propanol, isopropanol, butanol, heptanol, cyclohexanol, phenol, benzyl alcohol, o-cresol, m-cresol, p-cresol, ethylene glycol, propylene glycol, butanediol, glycerin, and catechol; halides, such as methyl chloride, methyl bromide, methyl iodide, ethyl chloride, ethyl bromide, ethyl iodide, butyl chloride, butyl bromide, butyl iodide, benzyl chloride, benzyl bromide, benzyl iodide, trimethylsilyl fluoride, trimethylsilyl chloride, trimethylsilyl bromide, trimethylsilyl iodide, triethylsilyl fluoride, triethylsilyl chloride, triethylsilyl bromide, triethylsilyl iodide, tributylsilyl fluoride, tributylsilyl chloride, tributylsilyl bromide, tributylsilyl iodide, triphenylsilyl fluoride, triphenylsilyl chloride, triphenylsilyl bromide, and triphenylsilyl iodide; ketones, such as 2-heptanone, 4-methyl-2-pentanone, cyclopentanone, 2-hexanone, 2-pentanone, cyclohexanone, 3-pentanone, acetophenone, 2-butanone, and acetone; esters, such as methyl acetate, ethyl acetate, and butyl acetate; epoxy compounds, such as ethylene oxide, propylene oxide, 1,2-butylene oxide, 2,3-butylene oxide, styrene oxide, and cyclohexene oxide; and silyl hydride compounds, such as methyldichlorosilane, ethyldichlorosilane, propyldichlorosilane, butyldichlorosilane, pentyldichlorosilane, hexyldichlorosilane, heptyldichlorosilane, octyldichlorosilane, nonyldichlorosilane, decyldichlorosilane, phenyldichlorosilane, dimethylchlorosilane, diethylchlorosilane, dipropylchlorosilane, dibutylchlorosilane, dipentylchlorosilane, dihexylchlorosilane, diheptylchlorosilane, dioctylchlorosilane, dinonylchlorosilane, didecylchlorosilane, methylpropylchlorosilane, methylhexylchlorosilane, methylphenylchlorosilane, diphenylchlorosilane, dimethylmethoxysilane, dimethylethoxysilane, dimethylpropoxysilane, dimethylbutoxysilane, dimethylphenoxysilane, dimethylbenzyloxysilane, diethylmethoxysilane, diethylethoxysilane, diethylpropoxysilane, diethylbutoxysilane, diethylphenoxysilane, diethylbenzyloxysilane, dipropylmethoxysilane, dipropylethoxysilane, dipropylpropoxysilane, dipropylbutoxysilane, dipropylphenoxysilane, dipropylbenzyloxysilane, dibutylmethoxysilane, dibutylethoxysilane, dibutylpropoxysilane, dibutylbutoxysilane, dibutylphenoxysilane, dibutylbenzyloxysilane, diphenylmethoxysilane, diphenylethoxysilane, diphenylpropoxysilane, diphenylbutoxysilane, diphenylphenoxysilane, diphenylbenzyloxysilane, dimethylsilane, diethylsilane, dipropylsilane, dibutylsilane, diphenylsilane, diphenylmethylsilane, diphenylethylsilane, diphenylpropylsilane, diphenylbutylsilane, trimethylsilane, triethylsilane, tripropylsilane, tributylsilane, triphenylsilane, methylsilane, ethylsilane, propylsilane, butylsilane, phenylsilane, methyldiacetoxysilane, polymethylhydrosiloxane, polyethylhydrosiloxane, polypropylhydrosiloxane, polybutylhydrosiloxane, polypentylhydrosiloxane, polyhexylhydrosiloxane, polyheptylhydrosiloxane, polyoctylhydrosiloxane, polynonylhydrosiloxane, polydecylhydrosiloxane, polyphenylhydrosiloxane, 1,1,3,3-tetramethyldisiloxane, methylhydrocyclosiloxane, ethylhydrocyclosiloxane, propylhydrocyclosiloxane, butylhydrocyclosiloxane, phenylhydrocyclosiloxane, 1,1,3,3-tetramethyldisilazane, 1,1,3,3-tetraethyldisilazane, 1,1,3,3-tetrapropyldisilazane, 1,1,3,3-tetrabutyldisilazane, and 1,1,3,3-tetraphenyldisilazane.

The polymerization terminators may be used alone or may be used in combination of two or more thereof.

The polymerization terminator may be used upon being diluted with a solvent which can be used for the polymerization reaction. Though the use amount of the polymerization terminator is not particularly limited, the matter that the use amount of the polymerization terminator does not become excessive relative to the growing terminal anion is preferred from the viewpoint of recovering and reusing the solvent, and in the case of hydrogenating the polymer, such is also preferred from the standpoint that the use amount of a hydrogenation catalyst can be reduced.

A conversion of the 1,3,7-octatriene after completion of the anionic polymerization, as determined by gas chromatography, is preferably 80.0% or more, more preferably 90.0% or more, still more preferably 95.0% or more, and especially preferably 97.0% or more, and it is also possible to achieve the conversion of 98.0% or more.

(Hydrogenation Reaction)

From the viewpoints of heat resistance, oxidation resistance, weather resistance, ozone resistance, etc. of the polymer, at least a part or the whole of carbon-carbon double bonds which the polymer has may be hydrogenated. Typically, in the production method of the polymer, to the polymer solution obtained by polymerization termination or the polymer solution optionally diluted with the aforementioned solvent, a hydrogenation catalyst is added to act on hydrogen, a hydride of the polymer can be produced.

Examples of the hydrogenation catalyst include Raney nickel; a heterogeneous catalyst in which a metal, such as Pt, Pd, Ru, Rh, and Ni, is supported on a carrier, such as carbon, alumina, and diatomaceous earth; a Ziegler-type catalyst composed of a combination of a transition metal compound with an alkylaluminum compound, an alkyllithium compound, or the like; and a metallocene-based catalyst.

A temperature of the hydrogenation reaction is preferably −20 to 250° C., the temperature of which is equal to or higher than the freezing point of the solvent and not higher than the heat decomposition temperature of the polymer, and it is more preferably 30 to 150° C. from the viewpoint of industrially advantageously producing the hydride of the polymer. When the hydrogenation reaction temperature is 30° C. or higher, the hydrogenation reaction is advanced, and when it is 150° C. or lower, even if heat decomposition of the hydrogenation catalyst occurs, the hydrogenation reaction can be carried out at a low use amount of the hydrogenation catalyst. The hydrogenation reaction temperature is still more preferably 60 to 100° C. from the viewpoint of reducing the use amount of the hydrogenation catalyst.

The hydrogen can be used in a gaseous form, and its pressure is not particularly limited so long as it is atmospheric pressure or higher; however, it is preferably 0.1 to 20 MPaG from the viewpoint of industrially advantageously producing a hydride of the polymer. When the pressure is 20 MPaG or lower, even if hydrogen decomposition of the hydrogenation catalyst occurs, the hydrogenation reaction can be carried out at a low use amount of the hydrogenation catalyst. The pressure of hydrogen is still more preferably 0.5 to 10 MPaG from the viewpoint of reducing the use amount of the hydrogenation catalyst.

Though the time required for the hydrogenation reaction can be properly selected according to a condition, it is preferably a range of from 10 minutes to 24 hours since commencement of co-presence of the catalyst from the viewpoint of industrially advantageously producing a hydride of the polymer.

As for the reaction mixed liquid after completion of the hydrogenation reaction, after being optionally diluted with the aforementioned solvent or concentrated, it is washed with a basic aqueous solution or an acidic aqueous solution, whereby the hydrogenation catalyst can be removed.

As for the polymer solution obtained after the polymerization reaction or the polymer solution obtained after the hydrogenation reaction, after subjecting to a concentration operation, the resultant may be fed into an extruder, thereby isolating the polymer; it may be brought into contact with steam to remove the solvent and so on, thereby isolating the polymer; or it may be brought into contact with an inert gas in a heated state to remove the solvent and so on, thereby isolating the polymer.

(Production Method of High-Purity 1,3,7-Octatriene)

As the production method of 1,3,7-octatriene, a production method of 1,3,7-octatriene having a purity, as determined by gas chromatography, of more than 98.0% is selected; or in the case of 1,3,7-octatriene having a purity of 98.0% or less, it is necessary to purity it to acquire 1,3,7-octatriene having a purity of more than 98.0%.

For example, a method of dimerizing butadiene in the presence of a palladium catalyst, as described in JP 46-24003 B; and deacetylation reaction of 1-acetoxy-2,7-octadiene as described in JP 47-17703 A can be utilized.

On the occasion of producing 1,3,7-octatriene, it is known that 1,3,6-octatriene, 2,4,6-octatriene, or the like, in which the position of a double bond is different, is formed as a by-product. Owing to the matter that a boiling point of such a by-product is close to the boiling point of 1,3,7-octatriene, it is difficult to undergo distillation separation of the by-product from 1,3,7-octatriene, and therefore, it is preferred to adopt the production method of 1,3,7-octatriene, in which the by-product is a few.

In the case where the total content of a peroxide and its decomposition product in 1,3,7-octatriene is more than 0.30 mmol/kg, it is preferred to use 1,3,7-octatriene after reducing the contents of the peroxide and its decomposition product. Though a method of reducing the contents of the peroxide and its decomposition product is not particularly limited, examples thereof include an alumina treatment; and a method in which a compound having a function as an antioxidant and having a higher boiling point than that of 1,3,7-octatriene (for example, 4-tert-butyl catechol, 2,4-di-tert-butylphenol, and triphenyl phosphine) is mixed with 1,3,7-octatriene, followed by performing a distillation treatment. Above all, it is preferred to utilize an alumina treatment.

EXAMPLES

The present invention is hereunder described in more detail by reference to Examples, but it should be construed that the present invention is by no means limited by such Examples.

The production of 1,3,7-octatriene was carried out in an inert gas atmosphere of nitrogen, argon, or the like, without being particularly indicated.

As for all of liquid medicines, those obtained by not only substituting a dissolved gas with an inert gas but also removing an antioxidant and water were used unless otherwise indicated.

As 2,7-octadien-1-ol that is a production raw material of 1,3,7-octatriene, 2,7-octadien-1-ol having a purity of 99.54%, as manufactured by Kuraray Co., Ltd., was used. The foregoing purity was determined according to the following measurement method.

(Measurement Method of Purity of 2,7-Octadien-1-Ol)

The purity of 2,7-octadien-1-ol was determined by means of an analysis of gas chromatography under the following measurement condition. Specifically, a percentage of a "peak area capable of assigning to one 2,7-octadien-1-ol capable of being observed for a retention time of about 17.6 minutes" relative to "sum total of peak areas detected for a retention time of 5 to 20 minutes" was determined, and this was defined as the purity of 2,7-octadien-1-ol. The purity of 2,7-octadien-1-ol was found to be 99.54%.

<Measurement Condition of Gas Chromatography>

Apparatus: "GC-2010 Plus", manufactured by Shimadzu Corporation

Column: "Rxi-5 ms" (inside diameter: 0.25 mm, length: 30 m, film thickness: 1 μm), manufactured by Restek Corporation Carrier gas: Helium (113.7 kPaG) was allowed to flow at a flow rate of 1.37 mL/min.

Injection amount of sample: 0.1 μL of the liquid medicine was injected at a split ratio of 100/1.

Detector: FID

Temperature of detector: 280° C.

Temperature of vaporization chamber: 280° C.

Temperature rise condition: After holding at 70° C. for 12 minutes, the temperature was raised to 280° C. at a rate of 20° C./min, followed by holding for 5 minutes.

[Production Example 1] Production of 1,3,7-Octatriene (Acetylation Reaction of 2,7-Octadiene-1-Ol)

A flask having a capacity of 10 L and equipped with a thermometer, a nitrogen feed inlet, a dropping funnel having a capacity of 2 L, and a stirrer was prepared. After purging the interior of the flask with nitrogen, 1,500.8 g (11.892 mol) of 2,7-octadien-1-ol, 1,806.3 g (17.851 mol) of triethylamine, and 72.60 g (0.594 mol) of 4-dimethylaminopyridine were successively charged, and then, the contents were cooled by using a dry ice-acetone bath while stirring at 140 rpm until the liquid temperature reached −40° C., thereby obtaining a mixed liquid. Meanwhile, 1,821.5 g (17.842 mol) of acetic anhydride was charged in the dropping funnel, and the acetic anhydride was added dropwise over 1 hour such that the liquid temperature of the aforementioned mixed liquid was kept at −50 to −30° C.

After completion of the dropwise addition, the reaction was continued for 1 hour, and 700.0 g of distilled water was added to terminate the reaction. The organic phase was recovered and then successively washed with 1 L of a 5% hydrochloric acid two times, 1 L of a saturated sodium hydrogencarbonate aqueous solution two times, 1 L of distilled water one time, and 1 L of a saturated sodium chloride aqueous solution one time. The thus obtained organic phase was dehydrated by the addition of 170 g of anhydrous sodium sulfate, and the anhydrous sodium sulfate was then filtered off, to recover the organic phase.

The recovered organic phase was analyzed by means of gas chromatography under the same condition as in the aforementioned purity analysis of 2,7-octadien-1-ol, to calculate a purity of 1-acetoxy-2,7-octadiene. A percentage of a "sum total of two peak areas capable of being observed for a retention time of about 19.2 minutes and about 19.3 minutes, respectively" relative to a "sum total of peak areas detected for a retention time of 5 to 20 minutes", namely the purity of 1-acetoxy-2,7-octadiene was found to be 99.51%. 1,851.1 g (yield: 92.5%) of 1-acetoxy-2,7-octadiene having the foregoing purity was acquired.

(Deacetylation Reaction of 1-Acetoxy-2,7-Octadiene)

An interior of a 3-L vacuum distillation apparatus equipped with a Claisen tube distillation head connected with a receiver via a Liebig condenser, a stirrer, and a thermometer was purged with nitrogen, and 1,205.7 g (7.167 mol) of the above-obtained 1-acetoxy-2,7-octadiene, 26.7 g (0.119 mol) of palladium acetate, and 124.8 g (0.4758 mol) of triphenyl phosphine were charged. An internal pressure was controlled to 1.52 to 1.35 kPaA with a vacuum controller while stirring at 200 rpm, and distillation was performed at a rate of 8.0 g/min while heating such that the liquid temperature was 90° C. After removing 41.4 g of an initial distillate, 799.7 g of a subsequently distillated product was recovered.

The recovered distillate was successively washed with 500 mL of a 0.2 mol/L sodium hydroxide aqueous solution three times, 500 mL of distilled water one time, and 500 mL of a saturated sodium chloride aqueous solution one time. The organic phase was dried by the addition of 50 g of anhydrous sodium sulfate, and the anhydrous sodium sulfate was then filtered off, to recover the organic phase.

The recovered organic phase was analyzed by means of gas chromatography under the same condition as in the aforementioned purity analysis of 2,7-octadien-1-ol, and as a result, it was found to be a mixture composed of 46.9% of 1,3,7-octatriene, 23.7% of 1-acetoxy-2,7-octadiene, and 29.4% of 3-acetoxy-1,7-octadiene. 637.0 g of the organic phase was charged in a distillation apparatus having a McMahon packing filled therein and having an inside diameter of 25.4 mm and a height of 240 mm. A distillate was recovered under a condition at 22.1 to 13.0 kPaA such that a reflux ratio was 2 at 79.1 to 60.3° C.

The recovered organic phase was analyzed by means of gas chromatography under the same condition as in the aforementioned purity analysis of 2,7-octadien-1-ol, to calculate a purity of 1,3,7-octatriene. A percentage of a "sum of two peak areas capable of being assigned to 1,3,7-octatriene and observed for a retention time of near 8.7 minutes and 9.0 minutes, respectively" relative to a "sum total of peak areas capable of being assigned to all of the octatrienes and detected for a retention time of 5 to 20 minutes" was calculated according to the following formula 1, and as a result, it was found to be 99.3%. Here, all of the octatrienes mean all of 1,3,7-octatriene and double-bond isomers, such as 1,3,6-octatriene, 2,4,6-octatriene, and 1,4,6-octatriene.

(Formula 1)

$$\text{Purity (\%)} = \frac{\text{Peak area of 1,3,7-octatriene}}{\text{Sum total of peak areas of all of octatrienes}} \times 100$$

A total content of the peroxide and its decomposition product in the above-obtained 1,3,7-octatriene was measured according to the following measurement method.

(Measurement Method of Total Content of Peroxide and its Decomposition Product)

After purging a 100-mL three-necked flask equipped with a gas feed port and a condenser with nitrogen, 5.00 g of 1,3,7-octatriene obtained by the aforementioned method was precisely weighed, 20.0 g of isopropyl alcohol, 5.0 g of distilled water, 2.0 g of acetic acid, and 1.6 g of potassium iodide dissolved in 1.5 g of distilled water were added, and then, the contents were heated and stirred for 5 minutes by using an oil bath at 95° C.

After taking out the three-necked flask from the oil bath, the interior of the condenser was washed with a mixed solvent of 6.0 g of isopropyl alcohol and 1.5 g of distilled water, and the washing liquid was mixed with the solution in the three-necked flask. After allowing to stand for cooling to room temperature, 0.005 mmol/mL of a sodium thiosulfate aqueous solution was added dropwise to the three-necked flask, and the total content of a peroxide and its decomposition product was calculated from a volume at which the color was faded from yellow to colorless according to the following formula 2. As a result, the total content of the peroxide and its decomposition product in 1,3,7-octatriene was found to be less than 0.015 mmol/kg.

(Formula 2)

$$\text{Total content of peroxide and its decomposition product (mmol/kg)} = \frac{0.005 \text{ (mmol/mL)} \times [\text{Dropwise addition amount of sodium thiosulfate (mL)}]}{2 \times 0.005 \text{ (kg)}}$$

There was thus obtained 1,3,7-octatriene having a purity of 99.3% and having a total content of the peroxide and its decomposition product of less than 0.015 mmol/kg. The results are shown in Table 1.

[Production Example 2] Production of 1,3,7-Octatriene

The 1,3,7-octatriene acquired in Production Example 1 was transferred into a glass flask and allowed to stand at room temperature (20 to 25° C.) for 100 hours in an air atmosphere without shading. The purity of the obtained 1,3,7-octatriene and the total content of the peroxide and its decomposition product are shown in Table 1.

[Production Example 3] Production of 1,3,7-Octatriene

The 1,3,7-octatriene acquired in Production Example 1 was transferred into a glass flask and allowed to stand at room temperature (20 to 25° C.) for 150 hours in an air atmosphere without shading. The purity of the obtained 1,3,7-octatriene and the total content of the peroxide and its decomposition product are shown in Table 1.

[Production Example 4] Production of 1,3,7-Octatriene (for Comparative Example 1)

The same operations as in Production Example 1 were followed, except that the distillation rate of 1,3,7-octatriene from the reaction system was changed to 5.0 g/min such that the purity of 1,3,7-octatriene was one as shown in Table 1. However, 10% by mass of alumina was added to the 1,3,7-octatriene having been distilled and purified, followed by storing for 20 hours in a nitrogen atmosphere. The purity of the obtained 1,3,7-octatriene and the total content of the peroxide and its decomposition product are shown in Table 1.

[Production Example 5] Production of 1,3,7-Octatriene (for Comparative Example 2)

The same operations as in Production Example 1 were followed, except that the distillation rate of 1,3,7-octatriene from the reaction system was changed to 4.0 g/min such that the purity of 1,3,7-octatriene was one as shown in Table 1. However, 10% by mass of alumina was added to the 1,3,7-octatriene having been distilled and purified, followed by storing for 20 hours in a nitrogen atmosphere. The purity of the obtained 1,3,7-octatriene and the total content of the peroxide and its decomposition product are shown in Table 1.

[Production Example 6] Production of 1,3,7-Octatriene

The 1,3,7-octatriene acquired in Production Example 1 was transferred into a glass flask and put into cold storage for 2,000 hours in an air atmosphere. The purity of the obtained 1,3,7-octatriene and the total content of the peroxide and its decomposition product are shown in Table 1.

In each of the following Examples, with respect to the conversion of 1,3,7-octatriene, the yield, weight average molecular weight (Mw), and molecular weight distribution (Mw/Mn) of the polymer, and the binding mode were determined according to the following measurement methods, respectively.

(Measurement Method of Conversion of 1,3,7-Octatriene)

1.00 g of ethylene glycol dimethyl ether was added to 5.00 g of the polymerization-terminated liquid obtained after completion of the polymerization reaction, and this mixed liquid was analyzed by means of gas chromatography under the following measurement condition.

The conversion (%) of 1,3,7-octatriene was calculated from a "relative area ratio of 1,3,7-octatriene and ethylene glycol dimethyl ether at 0 hour of commencement of polymerization reaction" and a "relative area ratio of unreacted 1,3,7-octatriene and ethylene glycol dimethyl ether after completion of polymerization reaction" according to the following formula 3.

<Measurement Condition of Gas Chromatography>

Apparatus: "GC-14B", manufactured by Shimadzu Corporation

Column: "Rxi-5 ms" (inside diameter: 0.25 mm, length: 30 m, film thickness: 0.25 μm), manufactured by Restek Corporation Carrier gas: Helium (140.0 kPaG) was allowed to flow at a flow rate of 1.50 mL/min.

Injection amount of sample: 0.1 μL of the liquid medicine was injected at a split ratio of 50/1.

TABLE 1

| 1,3,7-Octatriene | Production Example | | | | | |
|---|---|---|---|---|---|---|
|  | 1 | 2 | 3 | 4 | 5 | 6 |
| Purity (%) | 99.3 | 99.2 | 99.2 | 97.98 | 96.72 | 99.2 |
| Total content of peroxide and its decomposition product (mmol/kg) | <0.015 | 0.065 | 0.123 | 0.005 | 0.015 | 3.35 |

Hereinafter, the production of a polymer was carried out in an argon gas atmosphere unless otherwise indicated.

As reagents used in each of the Examples and Comparative Examples, the following were used.

As for cyclohexane, cyclohexane (not containing a stabilizer), manufactured by Wako Pure Chemical Industries, Ltd., from which moisture had been removed by using Molecular Sieves 3A and further subjected to bubbling with an argon gas to purge the dissolved gas, was used.

As for sec-butyllithium, a cyclohexane solution of sec-butyllithium, manufactured by Asia Lithium Corporation, a concentration of which had been adjusted with the aforementioned cyclohexane to 1.26 mmol/g, was used.

All of tetrahydrofuran (not containing a stabilizer), diethyl ether (containing a stabilizer), triethylamine, 1,2-diethoxyethane (DEE), and N,N,N',N'-tetramethylethylenediamine (TMEDA), all of which are manufactured by Wako Pure Chemical Industries, Ltd., and 2,2-di(2-tetrahydrofuryl)propane (DTHFP), manufactured by Tokyo Chemical Industry Co., Ltd., from which moisture and the stabilizer had been removed by using neutral active alumina and further subjected to bubbling with an argon gas to purge the dissolved gas, were used.

As for polystyrene, standard polystyrene (weight average molecular weight (Mw)=1,300, molecular weight distribution (Mw/Mn)=1.06), manufactured by Wako Pure Chemical Industries, Ltd. was used.

Detector: FID

Temperature of detector: 280° C.

Temperature of vaporization chamber: 280° C.

Temperature rise condition: After holding at 40° C. for 10 minutes, the temperature was raised to 250° C. at a rate of 20° C./min, followed by holding for 5 minutes.

(Formula 3)

$$\text{Conversion (\%)} = \left\{1 - \frac{\text{Relative area ratio of 1,3,7-octatriene after completion of polymerization reaction}}{\text{Relative area ratio of 1,3,7-octatriene at 0 hour of commencement of polymerization reaction}}\right\} \times 100$$

(Measurement Method of Yield of Polymer)

The yield of the obtained polymer was determined on a basis of the charged amount of 1,3,7-octatriene according to the following formula 4.

$$\text{Yield (\%)} = \frac{\text{Mass of obtained polymer (g)}}{\begin{array}{c}\text{Mass of 1,3,7-octatriene}\\\text{used for polymerization reaction (g)}\end{array}} \times 100 \quad \text{(Formula 4)}$$

(Measurement Method of Weight Average Molecular Weight (Mw) and Molecular Weight Distribution (Mw/Mn))

To 0.10 g of the obtained polymer, 60.0 g of tetrahydrofuran was added to prepare a uniform solution; this solution was analyzed by means of gel permeation chromatography under the following measurement condition, to determine the weight average molecular weight (Mw) and the number average molecular weight (Mn) as expressed in terms of standard polystyrene; and the molecular weight distribution (Mw/Mn) was calculated.

<Measurement Condition of Gel Permeation Chromatography>

Apparatus: "HLC-8320GPC EcoSEC", manufactured by Tosoh Corporation

Column; Two of "TSKgel SuperMultipore HZ-M" (inside diameter: 4.6 mm, length: 150 mm), manufactured by Tosoh Corporation were connected in series and used.

Eluent: Tetrahydrofuran was allowed to flow at a flow rate of 0.35 mL/min.

Injection amount of sample: 10 µL

Detector: RI

Temperature of detector: 40° C.

(Binding Mode)

To 150 mg of the obtained polymer, 1.00 g of deuterochloroform was added to prepare a uniform solution, and this solution was subjected to $^{13}$C-NMR measurement under the following measurement condition.

<$^{13}$C-NMR Measurement Condition>

Apparatus: "JNM-LA500", manufactured by JEOL Ltd.

Reference material: Tetramethylsilane

Measurement temperature: 25° C.

Cumulative number: 15,000 times

As a result of the $^{13}$C-NMR measurement, a "peak capable of being assigned to one carbon atom of the 1,2-bond" of 1,3,7-octatriene was observed at δ138.1 to 138.6 ppm; "peaks capable of being assigned to one carbon atom of the 1,4-bond and one carbon atom of the 3,4-bond" were observed at δ138.8 to 139.4 ppm; and a "peak capable of being assigned to one carbon atom of the 3,4-bond" was observed at δ140.9 to 141.6 ppm. A value obtained by subtracting a peak area at δ140.9 to 141.6 ppm from a peak area at δ138.8 to 139.4 ppm was defined as a peak area corresponding to one carbon atom of the 1,4-bond.

Ratios of the 1,2-bond, the 1,4-bond, and the 3,4-bond derived from 1,3,7-octatriene contained in the polymer were determined according to the following formulae 5 to 7, respectively.

$$\text{Ratio of the 1,2-bond (\%)} = \quad \text{(Formula 5)}$$
$$\frac{\text{Peak area assigned to the 1,2-bond}}{\begin{array}{c}\text{Sum total of peak areas assigned to}\\\text{the 1,2-bond, the 1,4-bond, and the 3,4-bond}\end{array}} \times 100$$

$$\text{Ratio of the 1,4-bond (\%)} = \quad \text{(Formula 6)}$$
$$\frac{\text{Peak area assigned to the 1,4-bond}}{\begin{array}{c}\text{Sum total of peak areas assigned to}\\\text{the 1,2-bond, the 1,4-bond, and the 3,4-bond}\end{array}} \times 100$$

$$\text{Ratio of the 3,4-bond (\%)} = \quad \text{(Formula 7)}$$
$$\frac{\text{Peak area assigned to the 3,4-bond}}{\begin{array}{c}\text{Sum total of peak areas assigned to}\\\text{the 1,2-bond, the 1,4-bond, and the 3,4-bond}\end{array}} \times 100$$

[Example 1] Production of Polymer

The interior of an SUS316 (registered trademark)-made autoclave having a capacity of 1 L and equipped with a thermometer, an electric heater, an electromagnetic induction agitator, a liquid medicine charging port, and a sampling port was purged with argon, and then, 232.0 g of cyclohexane was charged. Subsequently, 154.5 g (1.43 mol) of the 1,3,7-octatriene obtained in Production Example 1 was charged. Thereafter, the internal pressure was regulated with argon to 0.1 MPaG, and then, the temperature was raised to 50° C. over 30 minutes while stirring at 250 rpm. 1.118 g (15.50 mmol) of tetrahydrofuran (THF) was charged in an argon gas stream, subsequently, 2.457 g of a cyclohexane solution containing 1.260 mmol/g of sec-butyllithium (3.10 mmol in terms of sec-butyllithium) was charged, and then, the internal pressure was regulated with argon to 0.3 MPaG. This point of time was defined as 0 hour of commencement of the polymerization reaction, and the reaction was performed for 2 hours while controlling the liquid temperature to 50° C.

Thereafter, 1.50 g of a cyclohexane solution containing 2.50 mmol/g of ethanol (3.75 mmol in terms of ethanol) was added, thereby terminating the polymerization reaction.

Subsequently, the whole amount of the obtained polymerization-terminated liquid was transferred into a 1-L eggplant type flask, and almost of all of the solvent was distilled off while heating at 40° C. and at 100 kPaA by using a rotatory evaporator. Furthermore, the aforementioned eggplant type flask was transferred into a vacuum dryer and dried for 12 hours while heating at 25° C. and at 0.1 kPaA, thereby acquiring 153.1 g of a polymer in a liquid state. The use amount of each of the reagents, the reaction condition, and the reaction results are shown in Table 2.

Examples 2 to 14

Polymers were obtained by performing the polymerization reaction in the same manner as in Example 1, except that each of the reagents and the use amount thereof and the reaction condition were changed to those as shown in Table 2. With respect to each polymer, the polymerization time was one described in Table 2, and the use amount of each of the reagents, the reaction condition, and the reaction results are shown in Table 2.

Example 15

A polymer was obtained by performing the polymerization reaction in the same manner as in Example 1, except for using the 1,3,7-octatriene obtained in Production Example 2 in places of the 1,3,7-octatriene obtained in Production Example 1 and further changing each of the reagents and the use amount thereof and the reaction condition as shown in Table 3. The polymerization time was 8 hours. The use amount of each of the reagents, the reaction condition, and the reaction results are shown in Table 3.

Example 16

A polymer was obtained by performing the polymerization reaction in the same manner as in Example 1, except for using the 1,3,7-octatriene obtained in Production Example 3 in places of the 1,3,7-octatriene obtained in Production Example 1 and further changing each of the reagents and the use amount thereof and the reaction condition as shown in Table 3. The polymerization time was 4 hours. The use amount of each of the reagents, the reaction condition, and the reaction results are shown in Table 3.

Example 17

A polymer was obtained by performing the polymerization reaction in the same manner as in Example 1, except for changing the polymerization temperature to one as shown in Table 3. The polymerization time was 6 hours. The use amount of each of the reagents, the reaction condition, and the reaction results are shown in Table 3.

Example 18

A polymer was obtained by performing the polymerization reaction in the same manner as in Example 17, except for changing the kind of the Lewis base and its used amount to ones as shown in Table 3. The polymerization time was 8 hours. The use amount of each of the reagents, the reaction condition, and the reaction results are shown in Table 3.

Examples 19 and 20

Polymers were obtained by performing the polymerization reaction in the same manner as in Example 10, except that the use amount of each of reagents was changed to one as shown in Table 3, thereby regulating a solid content concentration of the reaction liquid after completion of the anionic polymerization to 20% by mass and 64% by mass, respectively. The polymerization time was 9 hours and 2 hours, respectively. The use amount of each of the reagents, the reaction condition, and the reaction results are shown in Table 3.

Example 21(1)

A polymer having a living anionic active species at a molecular end thereof was obtained by performing the reaction for 3 hours in the same manner as in Example 1, except that the use amount of each of reagents was changed to one as shown in Table 3, thereby regulating a solid content concentration of the reaction liquid after completion of the anionic polymerization to 25% by mass. The use amount of each of the reagents, the reaction condition, and the reaction results are shown in Table 3.

Example 21(2)

To the autoclave containing the polymer having a living anionic active species as obtained in Example 21(1), 38.7 g (0.358 mol) of the 1,3,7-octatriene obtained in Production Example 1 was added, and the contents were allowed to react with each other for 4 hours, thereby obtaining a polymer. The use amount of each of the reagents, the reaction condition, and the reaction results are shown in Table 3.

Example 22

A polymer was obtained by performing the polymerization reaction in the same manner as in Example 15, except for using the 1,3,7-octatriene obtained in Production Example 6 in place of the 1,3,7-octatriene obtained in Production Example 1. The polymerization time was 3 hours. The use amount of each of the reagents, the reaction condition, and the reaction results are shown in Table 3.

Comparative Example 1

A polymer was obtained by performing the polymerization reaction in the same manner as in Example 15, except for using the 1,3,7-octatriene obtained in Production Example 4 in place of the 1,3,7-octatriene obtained in Production Example 1. The polymerization time was 10 hours. The use amount of each of the reagents, the reaction condition, and the reaction results are shown in Table 3.

Comparative Example 2

A polymer was obtained by performing the polymerization reaction in the same manner as in Example 15, except for using the 1,3,7-octatriene obtained in Production Example 5 in place of the 1,3,7-octatriene obtained in Production Example 1. The polymerization time was 10 hours. The use amount of each of the reagents, the reaction condition, and the reaction results are shown in Table 3.

[Comparative Example 3] Cationic Polymerization

Using the 1,3,7-octatriene obtained in Production Example 1, the polymerization reaction was performed in conformity with the method as described in Example 1 of PTL 2.

The interior of a glass-made three-necked flask having a capacity of 200 mL and equipped with a thermometer, a stirrer, a liquid medicine charging port, and a dropping funnel was purged with argon, and then, 33.1 g of monochlorobenzene was charged. Subsequently, 1.053 g of a hexane solution containing 1.339 mmol/g of ethylaluminum dichloride (1.41 mmol in terms of ethylaluminum dichloride) was charged at 25° C. in an argon gas stream, and the solution was stirred, thereby obtaining a catalyst solution. 7.5 g (0.069 mol) of the 1,3,7-octatriene obtained in Production Example 1 and 22.1 g of monochlorobenzene were charged in the dropping funnel, and this solution was slowly added at 25° C. to the aforementioned catalyst solution. After adding over 10 minutes, the reaction was performed at 25° C. for 6 hours, thereby obtaining a reaction mixed liquid. The reaction mixed liquid was added dropwise to 500 mL of methanol, thereby depositing a polymer.

The obtained polymer was dried for 12 hours while heating at 25° C. and at 0.1 kPaA, thereby acquiring 7.1 g of a polymer in a liquid state. The use amount of each of the reagents, the reaction condition, and the reaction results are shown in Table 3.

TABLE 2

| | Example | | | | | | |
|---|---|---|---|---|---|---|---|
| | 1 | 2 | 3 | 4 | 5 | 6 | 7 |
| Reaction condition | | | | | | | |
| Purity of 1,3,7-octatriene (%) | 99.3 | 99.3 | 99.3 | 99.3 | 99.3 | 99.3 | 99.3 |
| Total content of peroxide and its decomposition product (mmol/kg) | <0.015 | <0.015 | <0.015 | <0.015 | <0.015 | <0.015 | <0.015 |
| Use amount of 1,3,7-octatriene (mol) | 1.43 | 1.43 | 1.43 | 1.08 | 1.43 | 1.43 | 1.43 |
| Use amount of 1,3,7-octatriene (g) | 154.7 | 154.7 | 154.7 | 116.8 | 154.7 | 154.7 | 154.7 |
| Use amount of cyclohexane (g) | 232.0 | 232.0 | 207.0 | 422.5 | 232.0 | 225.0 | 232.0 |
| Use amount of monochlorobenzene (g) | | | | | | | |
| Solid content concentration after completion of polymerization reaction (mass %) | 40 | 40 | 40 | 20 | 40 | 40 | 40 |
| Use amount of anionic polymerization initiator (mmol) | 3.10 | 1.44 | 21.12 | 35.10 | 3.10 | 3.10 | 3.10 |
| (Total amount of raw material monomers)/(Anionic polymerization initiator) (molar ratio) | 461 | 993 | 68 | 31 | 461 | 461 | 461 |
| Use amount of cationic polymerization initiator (mmol) | | | | | | | |
| (Total amount of raw material monomers)/(Cationic polymerization initiator) (molar ratio) | | | | | | | |
| Kind of Lewis base | THF | THF | THF | THF | THF | THF | Et$_2$O |
| Use amount of Lewis base (g) | 1.118 | 0.519 | 7.615 | 12.655 | 2.235 | 4.493 | 1.149 |
| Use amount of Lewis base (mmol) | 15.50 | 7.20 | 105.60 | 175.50 | 31.00 | 62.31 | 15.50 |
| (Lewis base)/(Anionic polymerization initiator) (molar ratio) | 5 | 5 | 5 | 5 | 10 | 20.1 | 5 |
| Polymerization temperature (° C.) | 50 | 50 | 50 | 50 | 50 | 50 | 50 |
| Polymerization time (hr) | 2.0 | 4.0 | 0.3 | 0.5 | 1.0 | 1.0 | 6.0 |
| Reaction results | | | | | | | |
| Conversion of 1,3,7-octatriene (%) | 99.0 | 99.1 | 99.1 | 99.7 | 98.3 | 98.8 | 98.7 |
| Weight average molecular weight (Mw) of polymer | 71,100 | 140,700 | 37,900 | 4,800 | 67,300 | 68,600 | 69,200 |
| Molecular weight distribution (Mw/Mn) of polymer | 1.44 | 1.76 | 1.43 | 1.16 | 1.43 | 1.53 | 1.21 |
| Rate of 1,2-bond (%) | 48.6 | 48.5 | 49.4 | 50.6 | 48.8 | 48.6 | 47.7 |
| Rate of 1,4-bond (%) | 47.1 | 48.7 | 43.4 | 42.9 | 47.3 | 45.7 | 50.8 |
| Rate of 3.4-bond (%) | 4.3 | 2.8 | 7.2 | 6.5 | 3.9 | 5.7 | 1.5 |

| | Example | | | | | | |
|---|---|---|---|---|---|---|---|
| | 8 | 9 | 10 | 11 | 12 | 13 | 14 |
| Reaction condition | | | | | | | |
| Purity of 1,3,7-octatriene (%) | 99.3 | 99.3 | 99.3 | 99.3 | 99.3 | 99.3 | 99.3 |
| Total content of peroxide and its decomposition product (mmol/kg) | <0.015 | <0.015 | <0.015 | <0.015 | <0.015 | <0.015 | <0.015 |
| Use amount of 1,3,7-octatriene (mol) | 1.43 | 1.43 | 1.43 | 1.43 | 1.43 | 1.43 | 1.43 |
| Use amount of 1,3,7-octatriene (g) | 154.7 | 154.7 | 154.7 | 154.7 | 154.7 | 154.7 | 154.7 |
| Use amount of cyclohexane (g) | 188.0 | 232.0 | 232.0 | 232.0 | 232.0 | 232.0 | 232.0 |
| Use amount of monochlorobenzene (g) | | | | | | | |
| Solid content concentration after completion of polymerization reaction (mass %) | 40 | 40 | 40 | 40 | 40 | 40 | 40 |
| Use amount of anionic polymerization initiator (mmol) | 3.10 | 3.10 | 3.10 | 3.10 | 3.10 | 3.10 | 3.10 |
| (Total amount of raw material monomers)/(Anionic polymerization initiator) (molar ratio) | 461 | 461 | 461 | 461 | 461 | 461 | 461 |
| Use amount of cationic polymerization initiator (mmol) | | | | | | | |
| (Total amount of raw material monomers)/(Cationic polymerization initiator) (molar ratio) | | | | | | | |
| Kind of Lewis base | Et$_2$O | NEt$_3$ | TMEDA | TMEDA | TMEDA | DEE | DTHFP |
| Use amount of Lewis base (g) | 41.359 | 1.568 | 0.180 | 0.360 | 0.721 | 0.183 | 0.177 |

TABLE 2-continued

| | | | | | | | |
|---|---|---|---|---|---|---|---|
| Use amount of Lewis base (mmol) | 558.00 | 15.50 | 1.55 | 3.10 | 6.20 | 1.55 | 0.96 |
| (Lewis base)/(Anionic polymerization initiator) (molar ratio) | 180 | 5 | 0.5 | 1 | 2 | 0.5 | 0.31 |
| Polymerization temperature (° C.) | 50 | 50 | 50 | 50 | 50 | 50 | 50 |
| Polymerization time (hr) | 1.0 | 7.0 | 3.0 | 5.0 | 7.0 | 2.0 | 6.0 |
| Reaction results | | | | | | | |
| Conversion of 1,3,7-octatriene (%) | 99.1 | 98.6 | 98.8 | 99.4 | 86.1 | 98.2 | 99.2 |
| Weight average molecular weight (Mw) of polymer | 76,500 | 70,700 | 82,600 | 81,800 | 82,200 | 70,800 | 76,000 |
| Molecular weight distribution (Mw/Mn) of polymer | 1.27 | 1.19 | 1.43 | 1.61 | 1.72 | 1.28 | 1.57 |
| Rate of 1,2-bond (%) | 49.1 | 47.7 | 48.3 | 48.4 | 45.8 | 48.1 | 47.7 |
| Rate of 1,4-bond (%) | 46.8 | 50.5 | 46.1 | 39.4 | 31.7 | 46.3 | 47.7 |
| Rate of 3,4-bond (%) | 4.1 | 1.8 | 5.6 | 12.2 | 22.5 | 5.6 | 4.6 |

TABLE 3

| | Example | | | | | |
|---|---|---|---|---|---|---|
| | 15 | 16 | 17 | 18 | 19 | 20 |
| Reaction condition | | | | | | |
| Purity of 1,3,7-octatriene (%) | 99.2 | 99.2 | 99.3 | 99.3 | 99.3 | 99.3 |
| Total content of peroxide and its decomposition product (mmol/kg) | 0.065 | 0.123 | <0.015 | <0.015 | <0.015 | <0.015 |
| Use amount of 1,3,7-octatriene (mol) | 1.43 | 1.43 | 1.43 | 1.43 | 0.73 | 2.12 |
| Use amount of 1,3,7-octatriene (g) | 154.7 | 154.7 | 154.7 | 154.7 | 79.0 | 229.3 |
| Use amount of cyclohexane (g) | 232.0 | 232.0 | 232.0 | 232.0 | 316.0 | 127.0 |
| Use amount of monochlorobenzene (g) | | | | | | |
| Solid content concentration after completion of polymerization reaction (mass %) | 40 | 40 | 40 | 40 | 20 | 64 |
| Use amount of anionic polymerization initiator (mmol) | 3.00 | 3.00 | 3.10 | 3.10 | 1.54 | 4.58 |
| (Total amount of raw material monomers)/(Anionic polymerization initiator) (molar ratio) | 477 | 477 | 461 | 461 | 474 | 463 |
| Use amount of cationic polymerization initiator (mmol) | | | | | | |
| (Total amount of raw material monomers)/(Cationic polymerization initiator) (molar ratio) | | | | | | |
| Kind of Lewis base | — | TMEDA | THF | TMEDA | TMEDA | TMEDA |
| Use amount of Lewis base (g) | — | 0.349 | 1.118 | 0.360 | 0.179 | 0.532 |
| Use amount of Lewis base (mmol) | — | 3.00 | 15.50 | 3.10 | 1.54 | 4.58 |
| (Lewis base)/(Anionic polymerization initiator) (molar ratio) | — | 1 | 5 | 1 | 1 | 1 |
| Polymerization temperature (° C.) | 50 | 50 | 35 | 35 | 50 | 50 |
| Polymerization time (hr) | 8.0 | 4.0 | 6.0 | 8.0 | 9.0 | 2.0 |
| Reaction time after addition of 1,3,7-octatriene (hr) | | | | | | |
| Reaction results | | | | | | |
| Conversion of 1,3,7-octatriene (%) | 80.4 | 98.0 | 99.1 | 98.4 | 97.6 | 98.6 |
| Weight average molecular weight (Mw) of polymer | 60,000 | 71,000 | 68,800 | 76,900 | 87,800 | 69,700 |
| Molecular weight distribution (Mw/Mn) of polymer | 1.22 | 1.51 | 1.39 | 1.33 | 1.65 | 1.72 |
| Rate of 1,2-bond (%) | 44.4 | 48.1 | 47.5 | 47.1 | 49.5 | 49.7 |
| Rate of 1,4-bond (%) | 55.6 | 39.3 | 46.0 | 39.4 | 38.2 | 40.2 |
| Rate of 3,4-bond (%) | 0 | 12.6 | 6.5 | 13.5 | 12.3 | 10.1 |

| | Example | | | Comparative Example | | |
|---|---|---|---|---|---|---|
| | 21(1) | 21(2) | 22 | 1 | 2 | 3 |
| Reaction condition | | | | | | |
| Purity of 1,3,7-octatriene (%) | 99.3 | 99.3 | 99.2 | 97.98 | 96.72 | 99.3 |
| Total content of peroxide and its decomposition product (mmol/kg) | <0.015 | <0.015 | 3.35 | 0.005 | 0.015 | <0.015 |

TABLE 3-continued

| | | | | | | |
|---|---|---|---|---|---|---|
| Use amount of 1,3,7-octatriene (mol) | 0.715 | 1.073 | 1.43 | 1.43 | 1.43 | 0.0693 |
| Use amount of 1,3,7-octatriene (g) | 77.3 | 116.1 | 154.7 | 154.7 | 154.7 | 7.5 |
| Use amount of cyclohexane (g) | 232.0 | 232.0 | 232.0 | 232.0 | 232.0 | |
| Use amount of monochlorobenzene (g) | | | | | | 55.2 |
| Solid content concentration after completion of polymerization reaction (mass %) | 25 | 33 | 40 | 40 | 40 | 13 |
| Use amount of anionic polymerization initiator (mmol) | 1.55 | 1.55 | 3.00 | 3.00 | 3.00 | |
| (Total amount of raw material monomers)/(Anionic polymerization initiator) (molar ratio) | 461 | 692 | 477 | 477 | 477 | |
| Use amount of cationic polymerization initiator (mmol) | | | | | | 1.41 |
| (Total amount of raw material monomers)/(Cationic polymerization initiator) (molar ratio) | | | | | | 49 |
| Kind of Lewis base | THF | THF | TMEDA | TMEDA | TMEDA | — |
| Use amount of Lewis base (g) | 0.559 | 0.559 | 0.349 | 0.349 | 0.349 | — |
| Use amount of Lewis base (mmol) | 7.75 | 7.75 | 3.00 | 3.00 | 3.00 | — |
| (Lewis base)/(Anionic polymerization initiator) (molar ratio) | 5 | 5 | 1 | 1 | 1 | — |
| Polymerization temperature (° C.) | 50 | 50 | 50 | 50 | 50 | 25 |
| Polymerization time (hr) | 3.0 | | 3.0 | 10.0 | 10.0 | 6.0 |
| Reaction time after addition of 1,3,7-octatriene (hr) | | 4.0 | | | | |
| Reaction results | | | | | | |
| Conversion of 1,3,7-octatriene (%) | 98.0 | 94.1 | 27.4 | 97.5 | 88.6 | 99.3 |
| Weight average molecular weight (Mw) of polymer | 68,200 | 126,200 | 48,500 | 71,400 | 70,800 | 8,000 |
| Molecular weight distribution (Mw/Mn) of polymer | 1.40 | 1.80 | 2.05 | 2.09 | 2.17 | 3.71 |
| Rate of 1,2-bond (%) | 48.5 | 48.2 | 44.6 | 47.5 | 47.9 | — |
| Rate of 1,4-bond (%) | 47.5 | 47.0 | 35.5 | 39.0 | 39.5 | — |
| Rate of 3,4-bond (%) | 4.0 | 4.8 | 19.9 | 13.5 | 12.6 | — |

The Lewis bases described in Tables 2 and 3 are as follows.
THF: Tetrahydrofuran
$Et_2O$: Diethyl ether
$NEt_3$: Triethylamine
TMEDA: N,N,N',N'-Tetramethylethylenediamine
DEE: 1,2-Diethoxyethane
DTHFP: 2,2-Di(2-tetrahydrofuryl)propane From Tables 2 and 3, the molecular weight distribution (Mw/Mn) of the polymers obtained by subjecting 1,3,7-trioctatriene having a purity of more than 98.0% to anionic polymerization (see the Examples) was 2.05 or less, and are narrow as compared with those of the polymers obtained by subjecting 1,3,7-trioctatriene having a purity of 98.0% or less to anionic polymerization (see Comparatives 1 to 2). In particular, in the present Examples, in many cases, the molecular weight distribution (Mw/Mn) of 2.00 or less, and furthermore, 1.80 or less could be achieved. In this way, nevertheless a difference in the purity was not large, as for the polymers obtained in the Examples, the molecular weight distribution (Mw/Mn) could be made narrow. In addition, in the Examples other than Example 22, a high conversion can be achieved for a short time. In comparison between Example 22 and the other Examples, it is noted that when the total content of the peroxide and its decomposition product is 0.30 mmol/kg or less, it is easy to achieve the high conversion for a short time.

In particular, in Example 2, the polymer having a large weight average molecular weight (Mw) can be obtained.

In addition, from the results of Examples 1 to 14 and 16 to 22 using the Lewis base and the results of Example 15 not using the Lewis base, it is noted that in the case of using the Lewis base, there is a tendency that the high conversion can be achieved, and in particular, it is easy to achieve the high conversion for a short time.

Even by performing the polymerization reaction by regulating the solid content concentration after completion of the anionic polymerization to 20% by mass or 64% by mass, the polymer of 1,3,7-octatriene having a molecular weight distribution (Mw/Mn) of 2.05 or less could be obtained.

In the case of performing the cationic polymerization by reference to PTL 2, even when 1,3,7-octatriene having not only a purity of more than 98.0% but also a total content of a peroxide and its decomposition product of 0.30 mmol/kg or less was used, the molecular weight distribution became broad (see Comparative Example 3).

[Example 23] Production of Hydride

The same operations as in Example 1 were followed to acquire a cyclohexane solution containing a polymer composed of 1,3,7-octatriene.

(Preparation of Hydrogenation Catalyst)

In a 1-L three-necked flask having been purged with nitrogen, 25.1 g of a 2-ethylhexanoic acid solution of nickel(II) bis(2-ethylhexanoate) (containing 53.5 mmol of a nickel atom) (manufactured by Wako Pure Chemical Industries, Ltd.) was dissolved in 284.4 g of cyclohexane, 31.8 g (160.3 mmol) of triisobutylaluminum (manufactured by Nippon Aluminum Alkyls, Ltd.) was then added over 10 minutes, and the contents were stirred for 30 minutes, to prepare a hydrogenation catalyst. This hydrogenation catalyst was used for the following hydrogenation reaction.

(Hydrogenation Reaction)

The autoclave in which the aforementioned polymer had been produced was cooled to 25° C., 290 g of the polymer solution was then extracted, and subsequently, 290 g of cyclohexane was introduced. The interior of the autoclave was purged with a hydrogen gas and further pressurized with a hydrogen gas to 0.2 MPaG, and subsequently, the autoclave was heated such that the liquid temperature reached 75° C. Thereafter, 0.48 g of the aforementioned hydrogenation catalyst (corresponding to 114.55 ppm by mass in terms of a nickel metal relative to the polymer) was added, and subsequently, the contents were allowed to react for 2 hours by regulating an internal pressure with a hydrogen gas to 0.98 MPaG.

Thereafter, 0.48 g of the aforementioned hydrogenation catalyst (corresponding to 114.55 ppm by mass in terms of a nickel metal relative to the polymer) was added three times at intervals of 2 hours. The use amount of the hydrogenation catalyst was 458.2 ppm by mass in total as expressed in terms of a nickel metal relative to the polymer, and the time of the hydrogenation reaction was 8 hours after first introduction of the hydrogenation catalyst.

First of all, to 150 mg of the polymer before hydrogenation, 10 mg of standard polystyrene was added, and then, 1.00 g of deuterochloroform was added, thereby preparing a uniform solution. This solution was subjected to $^1$H-NMR measurement under the following measurement condition. In addition, to 150 mg of the hydride of the polymer, 10 mg of standard polystyrene was added, and then, 1.00 g of deuterochloroform was added, thereby preparing a uniform solution. This solution was also subjected to $^1$H-NMR measurement under the following measurement condition.

As a result of the $^1$H-NMR measurement under the following condition, as the binding modes constituted of octatrienes as a structural unit, "peaks capable of being assigned to four hydrogen atoms of the 1,2-bond, four hydrogen atoms of the 1,4-bond, and four hydrogen atoms of the 3,4-bond" were observed at 54.8 to 5.5 ppm; a "peak capable of being assigned to one hydrogen atom of the 3,4-bond" was observed at 65.5 to 5.7 ppm; and "peaks capable of being assigned to one hydrogen atom of the 1,2-bond, one hydrogen atom of the 1,4-bond, and one hydrogen atom of the 3,4-bond" were observed at 55.7 to 5.9 ppm. In addition, "peaks capable of being assigned to five hydrogen atoms of the aromatic ring of polystyrene" were observed at 66.2 to 7.5 ppm.

From the molar number of the double bonds of non-hydrogenated 1,3,7-octatriene relative to the total molar number of styrene in the polymer before the hydrogenation and the molar number of the double bonds of non-hydrogenated 1,3,7-octatriene relative to the total molar number of styrene in the polymer after the hydrogenation treatment, a hydrogenation rate as a ratio of the material hydrogenated with the double bonds derived from 1,3,7-octatriene was calculated to be 97.7%.

<$^1$H-NMR Measurement Condition>

Apparatus: "JNM-LA500", manufactured by JEOL Ltd.
Reference material: Tetramethylsilane
Measurement temperature: 25° C.
Cumulative number: 254 times

INDUSTRIAL APPLICABILITY

The polymer of the present invention is useful as a raw material of adhesives and lubricating agents as well as a functional material for various rubbers, such as a lubricant and a modifier.

The invention claimed is:

1. A polymer, comprising:
   95 mol % or more of a structural unit derived from 1,3,7-octatriene;
   wherein
   a content ratio of 1,2-bond relative to all binding modes is 35 to 65 mol %,
   a molecular weight distribution (Mw/Mn) of the polymer is 2.05 or less, and
   a weight average molecular weight (Mw) of the polymer is from 1,000 to 1,000,000.

2. The polymer according to claim 1, wherein the weight average molecular weight (Mw) is from 4,000 to 500,000.

3. The polymer according to claim 1, wherein the weight average molecular weight (Mw) is from 7,000 to 200,000.

4. The polymer according to claim 1, wherein the weight average molecular weight (Mw) is from 13,000 to 200,000.

5. The polymer according to claim 1, wherein the molecular weight distribution (Mw/Mn) is 1.80 or less.

6. The polymer according to claim 1, not having a living anionic active species at a molecular end thereof.

7. The polymer according to claim 1, having a living anionic active species at a molecular end thereof.

8. A hydrogenated polymer obtained by hydrogenation of the polymer of claim 1.

9. A method of producing a polymer containing a structural unit derived from 1,3,7-octatriene, the method comprising:
   subjecting 1,3,7-octatriene having a purity, as determined by gas chromatography, more than 98.0% to anionic polymerization, wherein
   a molecular weight distribution (Mw/Mn) of the polymer is 2.05 or less, and
   a weight average molecular weight (Mw) of the polymer is from 1,000 to 1,000,000.

10. The method according to claim 9, wherein impurities which is optionally contained in the 1,3,7-octatriene comprises at least one selected from the group consisting of a peroxide and a decomposition product of the peroxide, and a total content of the peroxide and the decomposition product in the 1,3,7-octatriene is 0.30 mmol/kg or less.

11. The method according to claim 9, wherein the purity of the 1,3,7-octatriene as determined by gas chromatography is 99.0% or more.

12. The method according to claim 9, wherein t anionic polymerization is carried out in the presence of a Lewis base.

13. The method according to claim 12, wherein a molar ratio of the Lewis base to a polymerization initiator used for the anionic polymerization [(Lewis base)/(polymerization initiator)] is from 0.01 to 1,000.

14. The method according to claim 12, wherein the Lewis base is a compound having at least one selected from the group consisting of an ether bond and a tertiary amino group in a molecule thereof.

15. The method according to claim 12, wherein the Lewis base is a compound having one atom having an unshared electron pair.

16. The method according to claim 12, wherein the Lewis base is a compound having two or more atoms having an unshared electron pair.

17. The method according to claim 16, wherein the Lewis base has multidentate properties.

18. The method according to claim 9, wherein a solid content concentration of a reaction liquid obtained after completion of the anionic polymerization is from 10 to 80% by mass.

19. The method according to claim 9, wherein the anionic polymerization is carried out at −50 to 200° C.

20. The method according to claim 9, wherein a conversion of the 1,3,7-octatriene after completion of the anionic polymerization, as determined by gas chromatography, is 80.0% or more.

21. The method according to claim 9, wherein a conversion of the 1,3,7-octatriene after completion of the anionic polymerization, as determined by gas chromatography, is 97.0% or more.

22. The polymer according to claim 1, wherein the weight average molecular weight (Mw) of the polymer is from 33,000 to 1,000,000.

* * * * *